Figure 1:
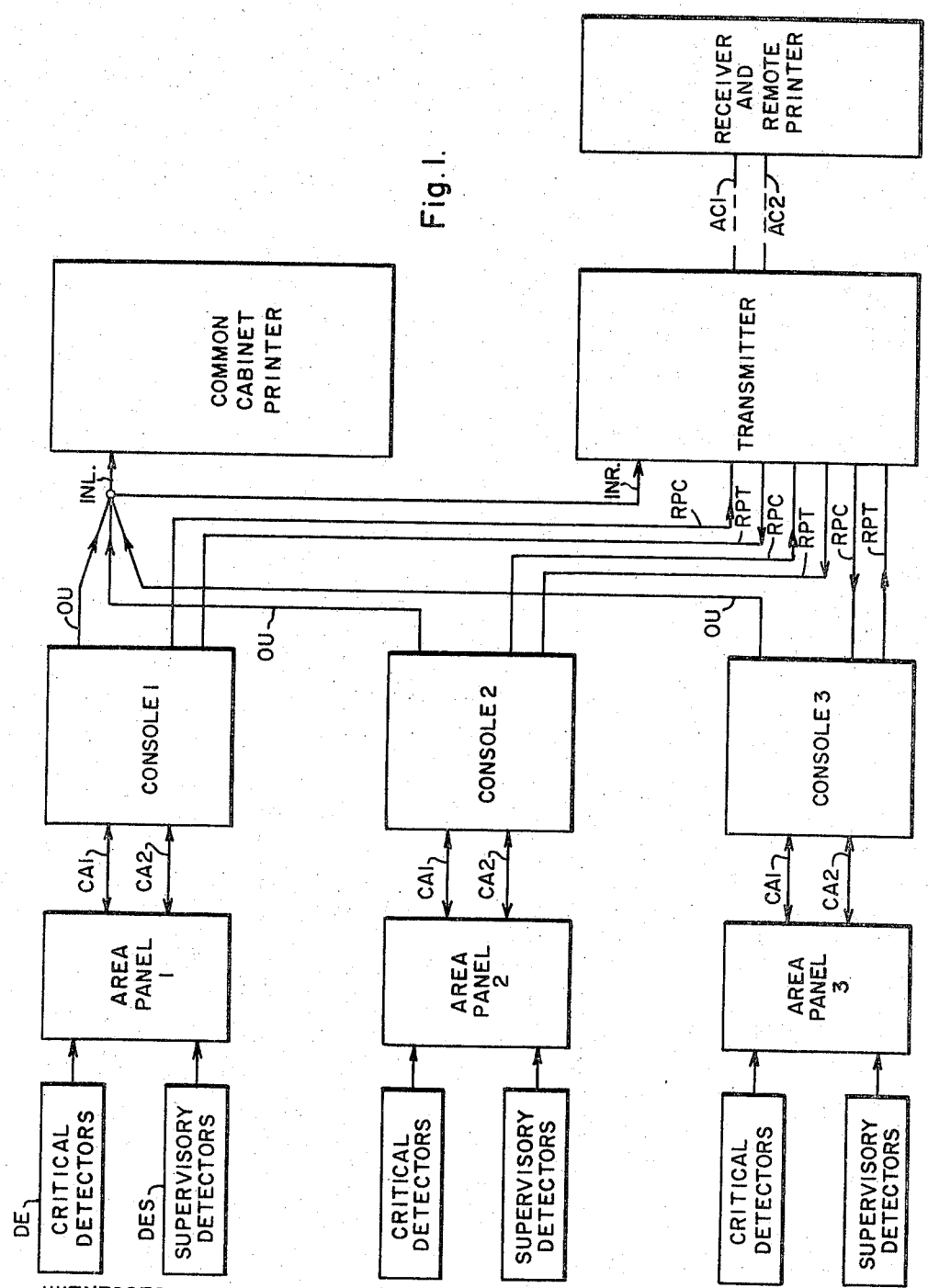

United States Patent Office 3,312,965
Patented Apr. 4, 1967

3,312,965
SUPERVISORY APPARATUS
Emmett J. Ward, Maplewood, N.J., assignor to Westinghouse Electric Corporation, Pittsburgh, Pa., a corporation of Pennsylvania
Filed May 7, 1964, Ser. No. 365,761
4 Claims. (Cl. 340—213)

This invention relates to the communication art and has particular relationship to apparatus for monitoring a region for abnormal conditions. Abnormal conditions monitored in the practice of this invention are referred to in this application as critical and non-critical. Critical abnormal conditions are typified by fires, burglaries and the like. Non-critical abnormal conditions are typified by defects in supervisory apparatus such as sprinkler systems or the like and may also be referred to as supervisory abnormal conditions.

Apparatus for monitoring for both critical and supervisory abnormal conditions is disclosed in an application Serial No. 322,242, filed November 7, 1963 to John Suozzo et al. and assigned to Westinghouse Electric Corporation. The Suozzo application is incorporated in this application by reference.

The Suozzo application discloses supervisory apparatus including a plurality of detectors for detecting both critical and supervisory abnormal conditions in a plurality of areas. For example, a monitored region may have fifty detectors of which thirty are for critical conditions and the other twenty for supervisory abnormal conditions. These fifty detectors are connected to communicate the intelligence of an abnormal condition and also of restoration from an abnormal condition to normality to an area panel. To cover an extended region or building or group of buildings there may be a number of sets of fifty detectors each and a corresponding number of area panels to each of which one of these sets communicates intelligence of conditions. Typically, there may be as many as 100 areas and as many as fifty detectors in each area. Each area panel processes the intelligence received from the detectors connected to it and is in two-way communication with an associated console which is usually continuously monitored by an attendant. The console produces visual and audible alarm signals of abnormal conditions and also signals of restoration. A local printer is associated with the consoles; typically, a single printer may be associated with a number of consoles in communication with an integrated group of area panels. The data as to an abnormality or restoration is printed on a tape by the printer. The data as to abnormalities and restorations is printed differently; abnormalities may be rendered in one color, for example red, and restorations to normality in another color, for example black. The typical data which appears on the printer is the date and time of the occurrence of the abnormality or restoration, the character of the abnormality, whether it is a fire or burglary or in supervisory apparatus, so that the site of an abnormal condition may be immediately known and prompt corrective action taken, the area panels, and the areas which they cover, are identified by numbers and the detectors connected to each area panel are also identified by numbers and these numbers are printed on the tape.

It is usually the duty of the attendant at the consoles to take remedial action on the occurrence of an abnormality. But to assure most effective remedial action, it is necessary that the record of an abnormality be printed at a position where apparatus or personnel is available to take action at once. Typically, such a position may be a fire station where the fire extinguishing vehicles and apparatus is located. Another typical position from which immediate remedial action may be taken is a police station or a police communication center where attendants may communicate with police vehicles. It is an object of this invention to provide facilities for producing a record of an abnormality in areas where immediate corrective action may be taken.

In accordance with this invention in its broad aspects facilities are provided for transmitting the data on the local printer to remote printers which may be located at positions where effective and prompt remedial action may be taken. It is an object of this invention to provide communication apparatus including such remote printers and to provide facilities for transmitting the intelligence or the data as to abnormal conditions and restorations which appear on the tape of the local printer to these remote printers.

In accordance with this invention the communication apparatus is provided which includes a transmitter associated and near the consoles and the local printer, and a receiver connected to a remote printer or remote printers. The inputs to the local printer are connected to the inputs to the transmitter so that the transmitter receives the same intelligence as is impressed on the local printer. This intelligence includes data as to the character of the abnormality or restoration, the color in which the remote printing is to take place, the number of the area panel and the number of the detector. The transmitter converts this data into a six-digit code each digit preferably consisting of a number of pulses. The first digit includes the data as to the character of the abnormality or the restoration. Typically, the first digit may consist of a single pulse for the occurrence of, or restoration from, a critical abnormality or two pulses for occurrence or restoration as to a supervisory defect. The second digit includes the color data (or the the character of the print) in which the information is to be presented at the remote-printer. Typically, the command to print in red is conveyed by a single pulse in the second digit and the data to print in black is conveyed by two pulses. A restoration of a critical abnormality would in this typical situation be communicated by the transmission of a single pulse in the first digit and two pulses in the second digit. The third and the fourth digits contain the number of the area or area panel. The third digit contains a number of pulses equal to the number in the tens place of this number of the area panel and the fourth digit contains a number of pulses equal to the number in the units place of the number of the area panel. Thus, the number 26 would be transmitted in the third and fourth digits as two pulses in the third digit and six pulses in the fourth digit. The number of the detector is correspondingly contained in the fifth and the sixth digits. The fifth digit includes a number of pulses equal to the number in the tens place of the number of the detector and the sixth digit includes a number of pulses equal to the number in the units place of the number of the detector. The information that the 37th detector had picked up an abnormality would be transmitted by three pulses in the fifth digit in seven pulses in the sixth digit.

In accordance with a specific aspect of this invention the pulses for the digits are produced by the stepping of a step switch in the transmitter. This step switch includes a wiper which passes successively over a number of contacts. Typically, a single step switch may have a number of banks of contacts and these banks can be used to achieve the necessary pulsing. In the practice of this invention the step switch is connected in the transmitter so that the passing of the wiper over the contacts is timed to produce the necessary pulsing. Thus, the first, second and third contacts of the step switch from the home position may serve to transmit the pulses containing the information as to the character of the abnormality or restoration. The apparatus may be so set that the wiper stops at the third contact for a sufficient time interval to enable the receiver to respond to the signaling as to the character of the abnormality or restoration and then continues on. The fourth, fifth and sixth contacts of the step switch serve to produce the color command for the printer. The wiper stops at the sixth contact long enough to afford the receiver adequate time to respond. Similarly, the seventh through the seventeenth contacts of the step switch serve to transmit the tenth place of the number of the area panel and the eighteenth through the twenty-eighth to transmit the units place of the number of the area panel. The twenty-ninth through the thirty-fourth contacts on the step switch serve to transmit the tenth place of the number of the detector and the thirty-fifth through the forty-sixth contacts serve to transmit the units place of the detector number. Apparatus is provided for causing the step switch to home that is to return to its initial position after it passes through the forty-fifth contact.

In the practice of this invention the transmitter is preset to operate the step switch so that it transmits the sixth digit code and thereafter the transmission is carried out. After the transmission is carried out the transmitter is reset to standby condition. A memory system containing the code is thus connected to the step switch.

At the receiver there is step switch means including a number of step switches which move in synchronism with the step switch at the transmitter and convert the code signal into corresponding operations of the printer mechanism. Typically, there are six of these step switches, the first operating to decode the first digit, the second digit and so on to the sixth which decodes the sixth digit of the transmitted code. The use of separate step switches rather than a single switch at the receiver dispenses with costly memory networks which would be demanded to set a single step switch for decoding.

Because there is only one printer associated with each set of consoles it is necessary to print in succession on the local printer the intelligence as to abnormal conditions in several areas or different abnormal conditions, in one area, which occur simultaneously. As the printing of the intelligence as to each of these simultaneously-occurring abnormal conditions by the remote printer is completed the transmitter must be maintained conditioned to transmit the intelligence of the succeeding abnormality to be printed. In accordance with this invention the transmitter is so conditioned by connections to contacts of the V relays of each of the consoles (FIGS. 3F, 3G Suozzo et al.) through which the appropriate supply conductors of the transmitter are maintained energized. So long as a V relay of any console remains energized the local printing of the corresponding alarm has not been completed. A contact of this same V relay maintains the transmitter conditioned to transmit so long as the V relay remains energized.

Because of the time required for coding by the transmitter and transmission of the code and printing, the remote printer lags behind the local printer and the local printing may be complete before the remote printing. In accordance with this invention, each console is interlocked with the transmitter in such a way as to continue to report to the associated area panel that the intelligence of an alarm is not printed until the remote printing is complete. The step switch at the area panel then continues to cycle and to report the abnormal condition or restoration to be printed.

Figure 3A:
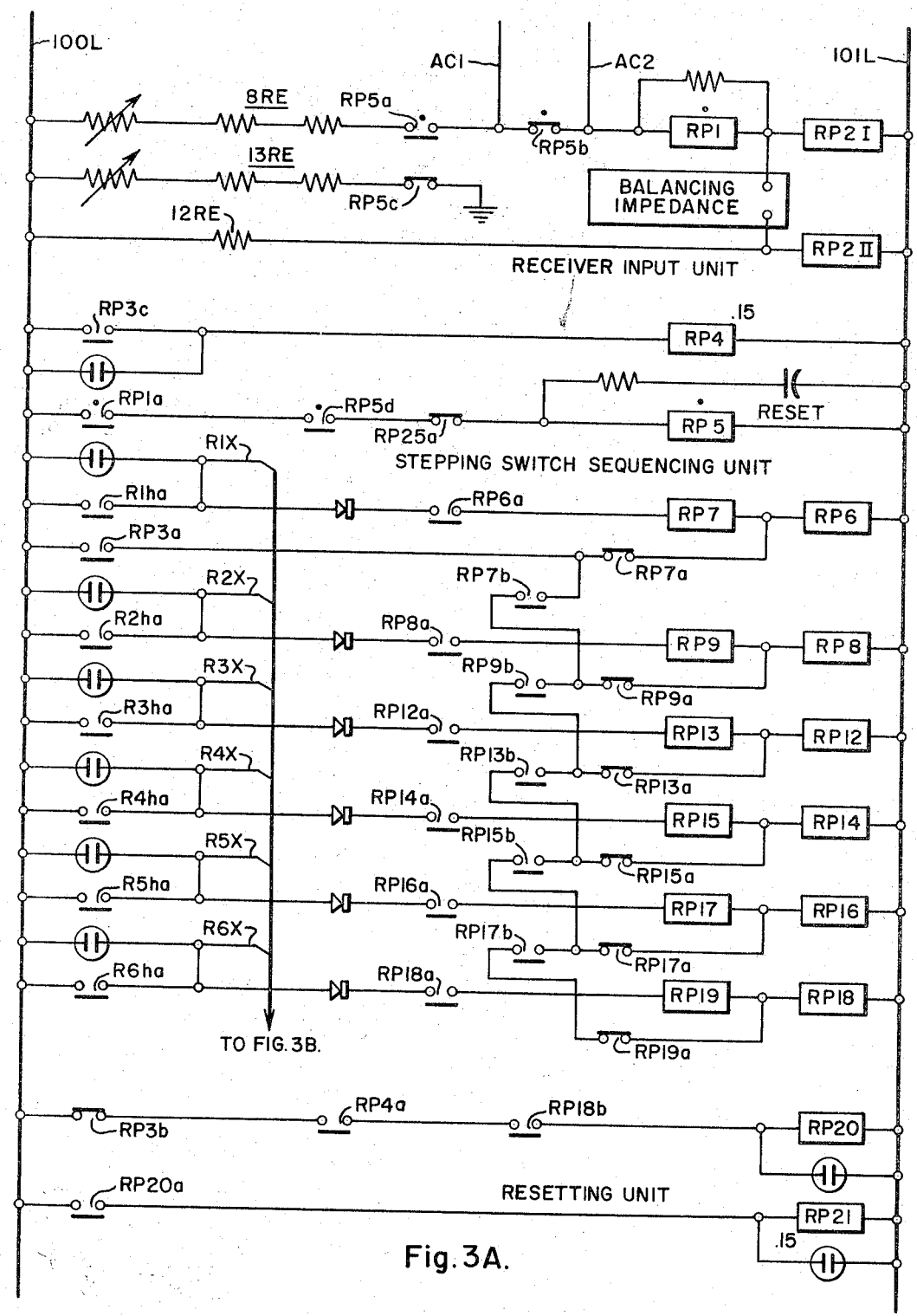
Figure 3B:
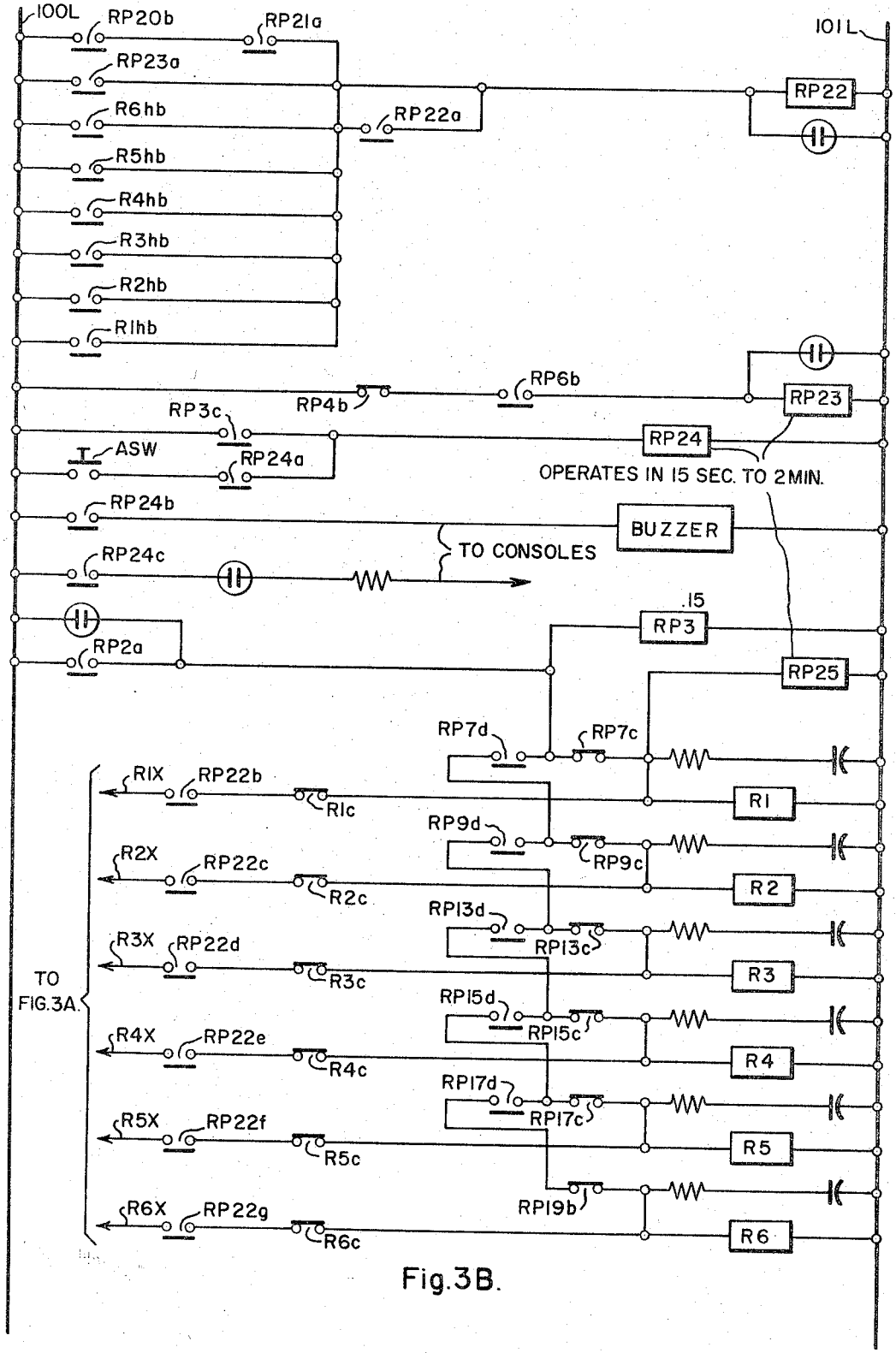
Figure 3C:
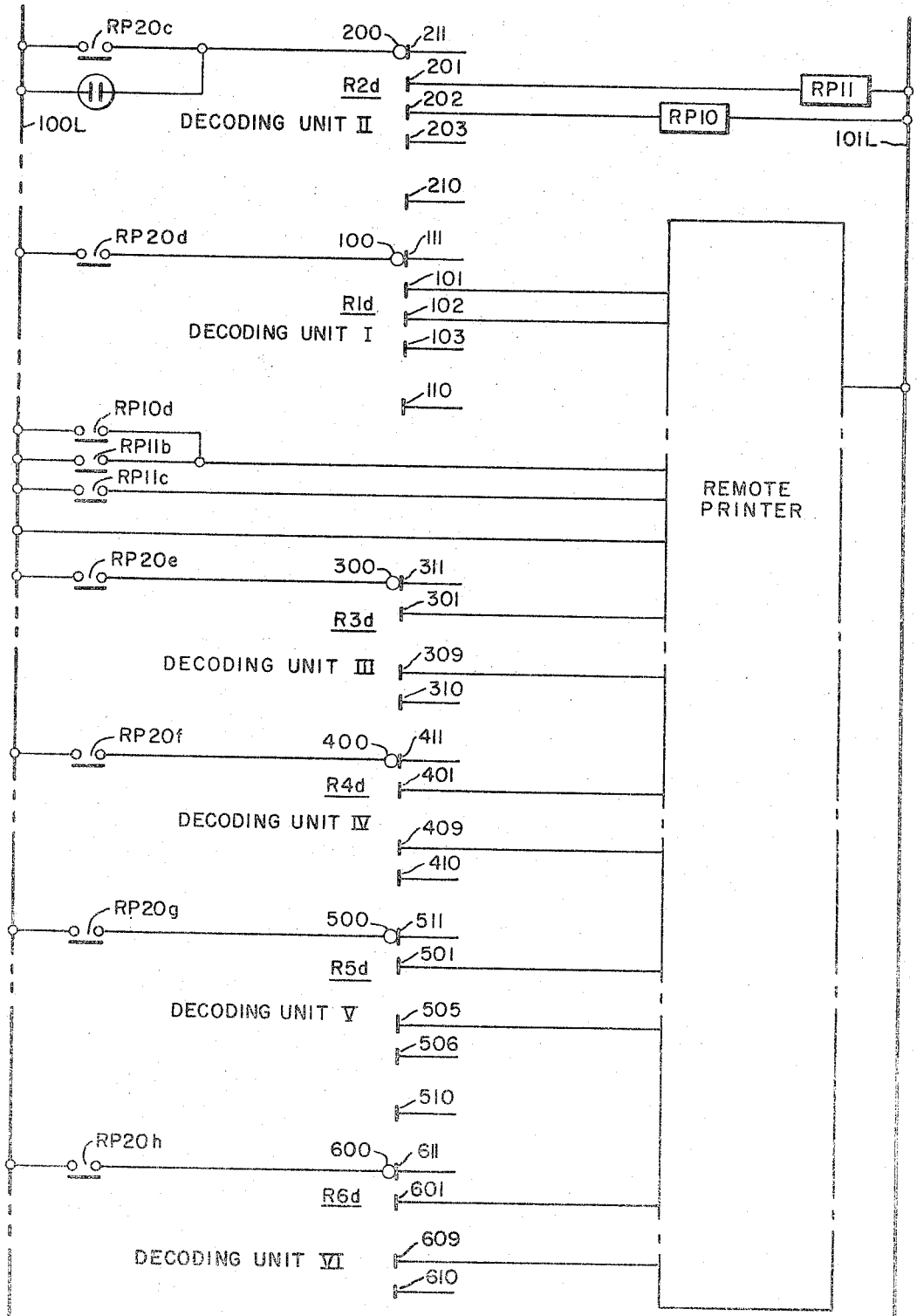
Figure 4:
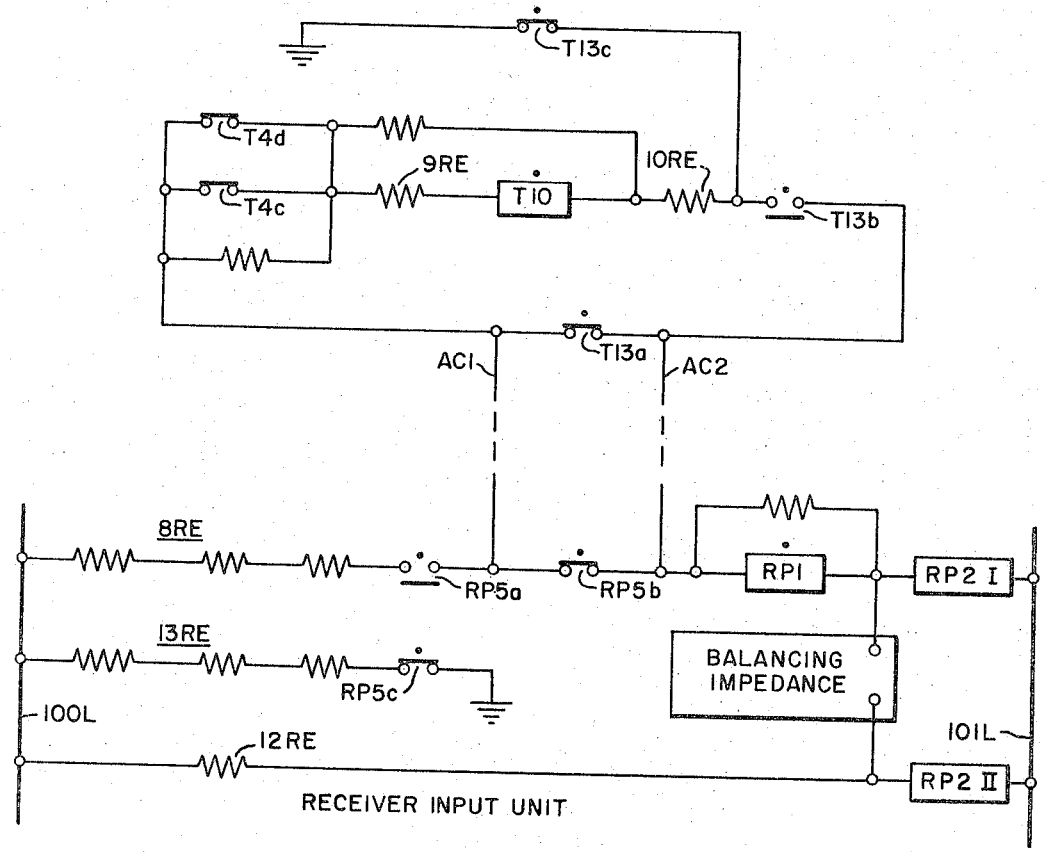

Novel features considered characteristic of this invention are described above. For a better understanding of this invention, both as to its organization and as to its method of operation, together with additional objects and advantages thereof, reference is made to the following description taken in connection with the accompanying drawings in which:

FIGURE 1 is a block diagram of an embodiment of this invention;

FIGS. 2A through 2H together constitute a schematic of the transmitter of an embodiment of this invention;

FIGS. 3A, 3B, 3C together constitute the schematic of the receiver of this embodiment; and FIG. 4 is a schematic showing the communication loop between the transmitter and the receiver and the apparatus at each terminal of the loop.

The apparatus shown in the drawings includes a plurality of Critical Detectors DE for detecting critical abnormalities such as fires and burglaries in the protected areas. There may be a number of sets of such Critical Detectors; three are shown in FIG. 1. These Critical Detectors are distributed around a protected area. Usually, the buildings or other regions protected may include a number of such areas over which the Critical Detectors DE are distributed so that the areas may be adequately served. The apparatus also includes a plurality of Supervisory Detectors DES. These Detectors are likewise distributed over the areas and are connected to detect abnormalities in the supervisory apparatus. Typically, an any area there may be as many as thirty Critical Detectors DE and twenty Supervisory Detectors DES. The Detectors in any area may be identified by numbers 1 through 50.

Each area is serviced by an Area Panel 1, 2, 3 which processes the intelligence from the Detectors DE and DES. Each Area Panel communicates through wires with the associated Detectors. The Area Panels may be identified by numbers like the Detectors.

The apparatus shown in the drawings includes a plurality of Consoles 1, 2, 3. A Console is associated with each Area Panel. Each Console is connected in two-way communication with the associated Area Panel through conductors CA1 and CA2. The Consoles are disposed at the communication center where they are attended continuously by an attendant.

The Consoles include signals for indicating that a critical abnormality or restoration has occurred. The attendant watches the display and takes the necessary corrective action. A common local printer is associated with the Consoles. This printer and other apparatus common to all of the Consoles is enclosed in a Common Cabinet Printer. The Consoles are connected to the Common Cabinet Printer through a plurality of conductors OU. The Printer produces a record of each abnormality or restoration in the areas protected. The apparatus thus far described is disclosed in detail in the above-mentioned Suozzo application Serial No. 322,242.

The apparatus according to this invention also includes one or more remote-printers which are typically located in areas where corrective action may be inititated immediately. Each remote-printer is actuated by the cooperation of a Transmitter located with the Consoles and the Common Cabinet Printer and a Receiver which is located with the remote-printer. The Receiver and Remote-Printer are shown in FIG. 1 as located together. The Transmitter is connected to the Receiver And Remote-Printer through conductors AC1 and AC2.

The outputs OU from Console 1, Console 2, Console 3 supply the input INL of the Common Cabinet Printer and the same outputs OU also supply the inputs INR of the Transmitter. The Transmitter feeds back intelligence to the Consoles through channels RPC which cause the associated Area Panels to continue to transmit the intelligence as to abnormalities or restorations until the data of this intelligence is printed on the remote-printer. The conductors RPT between each Console and the Transmitter maintain the Transmitter conditioned to be transmitted so long as any V relay in any Console remains actuated.

The apparatus according to this invention includes a number of relays which cooperate to produce the desired communication of the intelligence. The relays are labeled by a letter or by a letter followed by a number, for example T1, T6 and the like. The letter and number usually appears in the drawings within, or adjacent to, the coil of the relay. A number of the relays, for example C1 and C2 have two coils; the coils of such relays are labeled C1II and C1III. The contacts of the relays are labeled with a small letter a, b, c following the relay label. Thus, the contacts of relay C1 are labeled C1a, C1b ---. The state of the relays during stand-by is of interest in understanding the operation of the apparatus from the drawings alone.

The relays may be described as actuated during stand-by or unactuated during stand-by. A two coil relay may be energized but unactuated in situations in which the ampere turns of the coils counterbalance each other. In the drawings a relay which is actuated during stand-by is identified by a dot adjacent the rectangle which represents the coil; a similar dot appears adjacent each contact symbol. For example, adjacent the symbol representing the coil of T6 there is a dot. There is also a dot adjacent the contacts T6a, T6b, T6c and T6d of T6.

The apparatus includes a number of relays which are actuated immediately when their coils are energized but drop out a predetermined time interval after their coils are deenergized. These relays are called here slow drop-out relays. These relays are identified in the drawings by a decimal which indicates the part of a second taken by the relay to drop out; typically 0.1 indicates 100 milliseconds, 0.05, 50 milliseconds. There are also relays which become actuated a predetermined time interval after their coils are energized. These are called herein slow pick-up relays.

The coil of a step switch is identified in the same way as the coil of other relays. The step switch has a number of contacts which are also identified in the same way as the contacts of the other relays except that the homing contacts which are closed with the step switch away from home carry two small letters, an h and another letter which may be a, b, c ---. Thus such a contact of step switch SST is identified by SSTha. The banks of the step switches are identified by the capital letters identifying the step switch and a small letter. For example a bank of SST is identified by SSTc. The contacts of the different banks are numbered. For example, the banks of SSTc are numbered 1101 and so on.

The banks of the step switches which are used in the actual practice of this invention have 25 contacts. In situations in which more than 25 contacts are necessary the contacts of two banks are swept by wipers in succession. Thus the banks SSTd include a 1300 bank, 1301 through 1325 and a 1400 bank, 1401 through 1425. A wiper passes in engagement with the 1300 bank from 1300 through 1325 and as the step switch is stepped beyond the 25th step a wiper passes over the 1400 bank from 1400 through 1425.

In the following paragraphs certain properties and the functions of the relays of the Transmitter and Receiver are described.

---

The Transmitter includes a converter for converting the intelligence received by the Consoles into code. The converter also includes a Coding Unit. This converter also includes a plurality of Code Setting Units identified as Code Setting Units I through VI. Units I through VI respectively set the digits 1 through 6 of the code. The Transmitter includes an Output Unit for transmitting the intelligence as code to the Receiver And Remote Printer.

---

The Coding Unit includes the step switch SST and the relays T1, T2, T3, T4, T5, T6, T7, T8, T9, T10 and T18. The T relays cooperate with the step switch SST to set the code. The code is produced by the stepping of the wiper 1300 of the step switch over the contacts SSTd.

*SST—Step switch—unactuated in the home position in stand-by*

This step switch SST (FIG. 2G) operates to produce the six digit code; it counts the pulses which appear in each digit of the code. This step switch has a coil which is energized to cock the wiper spring for movement of the wiper arm; the coil is subsequently deenergized and the spring advances the wiper one step. The step switch includes composite banks SSTc and SSTd, respectively. The step switches readily available include banks in each of which there is a home contact and 25 off-home contacts. For this reason the banks SSTc and SSTd are composite, each including two sets of banks wiped by separate wipers in succession. SSTc includes the eleven-hundred bank which include contacts 1101 through 1126 and is wiped by wiper 1100 and the twelve-hundred bank including contacts 1201 through 1226 and wiped by wiper 1200. SSTd includes the thirteen-hundred bank including contacts 1301 through 1326 and wiped by wiper 1300 and the fourteen-hundred bank including contacts 1401 through 1426 and wiped by wiper 1400. The eleven-hundred and twelve-hundred banks are connected to operate in succession and the thirteen-hundred and fourteen-hundred banks are connected to operate in succession.

The step switch SST in cooperation with relays T1, T2, T3 (FIG. 2H), T4 and T5 operates to produce the coding. The step switch produces the pulses in each code as the wipers 1300 and 1400 pass over contacts 1301 through 1419. In transmitting intelligence as to a critical alarm the wiper 1300 moves from its home setting 1426 to 1301, producing one pulse, and then stops. In transmitting intelligence to a supervisory abnormality the wiper 1300 moves from 1426 to 1301, producing one pulse, and then to 1302 to produce the second pulse and then stops. To set the remote-printer for red the wiper 1300 moves from 1303 to 1304 and then to 1305, to produce two pulses, and then stops. For printing black the wiper moves only from 1303 to 1304. The tens place of the number of the area in which an abnormality occurs is identified by the movement of the wiper 1300 and 1306 through 1316. The units place of this area is identified by the subsequent movement of the wipers 1300 and 1401 from 1317 through 1401. The tens place of the number identifying the Detector is introduced into the fifth digit of the code by the movement of the wiper 1400 from 1402 through 1407. The units place of the number identifying the Detector is introduced in the sixth digit of the code by the movement of the wiper 1400 and 1409 through 1420.

The step switch SST has a plurality of contacts SSTha, SSThe, SSThf (FIG. 2H) to indicate that the step switch is away from the home position. These "h" contacts are open with the step switch SST in the home position and closed when the step switch is away from home. SST also has a homing contact SSTb which is normally closed and is repeatedly opened during a homing operation as the coil is energized to cock the wiper arm spring.

SST is preset for a coding operation by actuation of the appropriate "C," "S" (FIG. 2A), "AT" (FIG. 2B), "AU" (FIG. 2C), "DT" (FIG. 2D) and "DU" (FIG. 2E) relays. After these relays are set the coding operation is starting. The above relays are set by the signals to the local printer and operate as memory components for the code.

*Relay T1—slow drop-out relay—unactuated in stand-by*

This relay (FIG. 2G) starts the coding operation on the actuation of one of the relays C1 or C2.

*Relays T2, T3—slow drop-out—unactuated in stand-by*

These relays (FIGS. 2G, 2H) introduce a delay between the transmission or digits of the code, called inter-digit delay, to afford the Receiver and Remote-Printer Time to carry out its function. T1, T2, T3 are deenergized in succession and introduce the necessary delay in the stepping of the step switch SST.

*Relay T4—slow drop-out—unactuated in stand-by*

This relay times the pulses of the different digits of the code which are transmitted along the channel CA1–CA2. During the coding this relay is energized and picks up and is then deenergized and drops out after a time interval of about 60 milliseconds. On actuation of relay T4 contacts T4b and T4c open, introducing resistance in the signaling circuit (AC1–AC2) (FIG. 2H) and reducing the current flowing in this circuit. Typically the operation of relay T4 may reduce the current flowing in the channel AC1–AC2 from 0.0394 milliampere to 0.0057 milliampere. This reduction causes a 60-millisecond negative-going pulse to flow along the channels.

*Relay T5—slow drop-out—unactuated in stand-by*

This relay cooperates with T4 to cause T4 to operate repeatedly to produce the signaling and to cause step switch SST to advance the wiper. Actuation of T4 actuates T5 which in turn deenergizes T4 at contact T5a. This is a teeter-totter operation which causes the step switch to advance one step.

*Relay T6—actuated in stand-by*

This relay (FIG. 2H) causes the Transmitter to be reset when the step switch SST sticks away from home. This relay also opens the circuit to the RPC relays (FIG. 2A) if SST sticks. This enables the Consoles and Area Panels to operate without being affected by the Transmitter.

*Relay T9—slow pull-in (1.5 minutes)—unactuated in stand-by*

This relay causes T6 to drop out to perform its resetting function when SST sticks. T9 is energized when SST is away from home but must be energized continuously for 1.5 minutes to be actuated. If SST sticks for 1.5 minutes T9 is actuated dropping out T6.

*Relay T7—unactuated in stand-by*

This relay cooperates with T8 in the homing of step-switch SST. This relay is actuated when SST is away from home and actuates T8 to open the circuit through the home contact 1426 (FIG. 2G) until after SST returns to home.

*Relay T8—slow drop-out—unactuated in stand-by*

This relay cooperates with T7, it opens the home circuit at T8a until after SST returns to home.

*Relay T18—unactuated in stand-by*

This relay cooperates with bank SSTc to reset step switch SST after the transmission of a code.

Figure 2A:
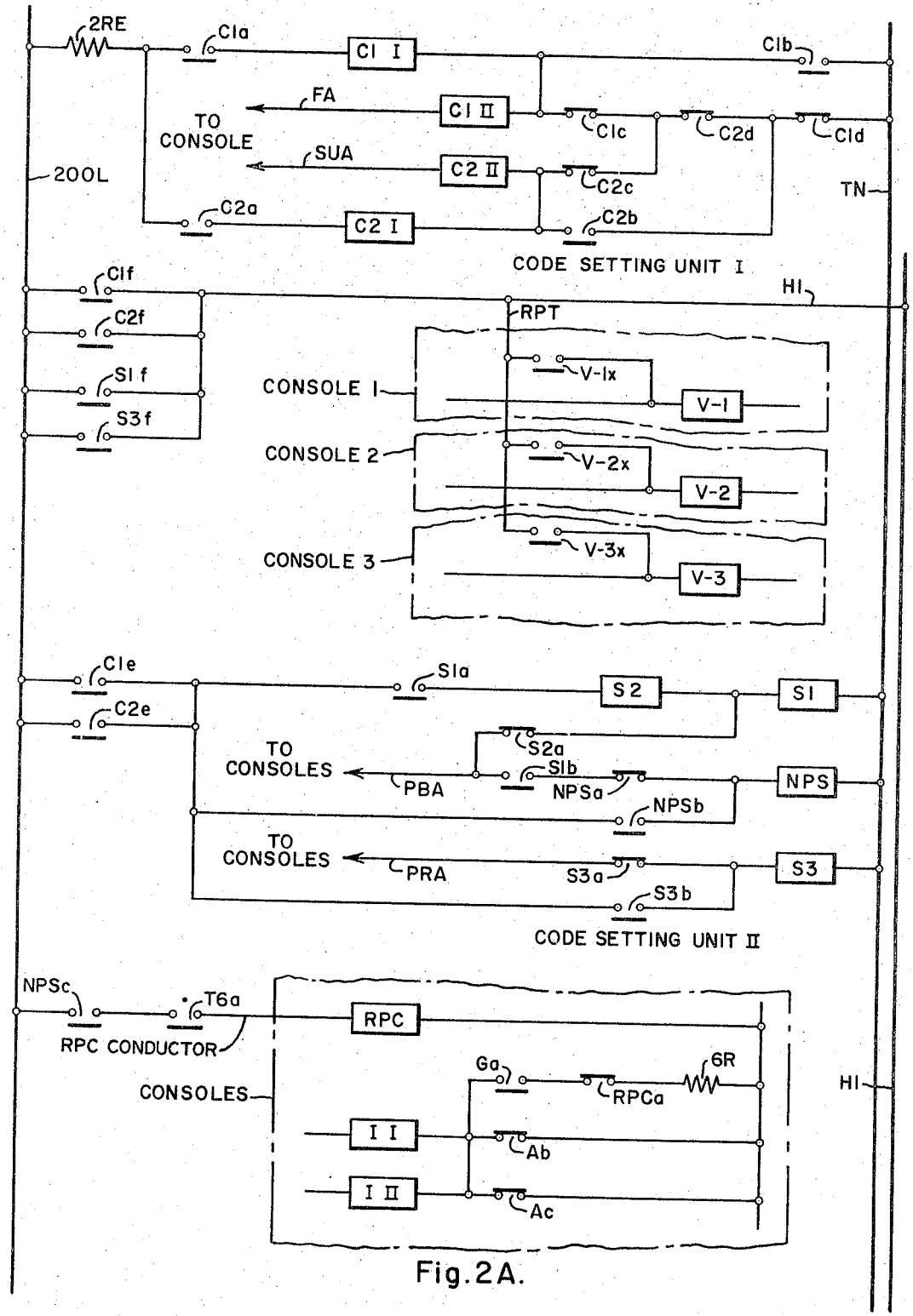

Code Setting Unit I includes relays C1 and C2 (FIG. 2A).

*Relay C1—two-coil relay—unactuated in stand-by*

This relay sets the step switch SST of the Transmitter for transmitting only a single pulse in the first digit of the code indicating a critical abnormal condition. When a critical abnormal condition occurs the Console involved impresses a pulse of positive polarity, having a duration of about 100 milliseconds on conductor FA energizing the coil C1II of C1. C1 is then actuated and locks itself in in circuit 200L, 2RE, C1a, C1I, C1b, TN and remains blocked in after the 100-millisecond pulse stops.

*Relay C2—two-coil relay—unactuated in stand-by*

This relay sets step-switch SST for transmitting two pulses on the first digit of the code indicating a non-critical abnormal condition involving supervisory equipment. In this case a pulse of positive polarity and of 100-millisecond duration is impressed on SUA from the Console involved. This energizes C2II and relay C2 is locked in in circuit 200L, 2RE, C2a, C2I, C2b, C1d, TN and remains locked in after the 100-millisecond pulse stops.

Code Setting Unit II includes relays S1, S2, S3 and NPS (FIG. 2A).

*S1—unactuated in standby*

This relay sets the stop switch SST for transmitting one pulse in the second digit of the code to command "print black." On the occurrence of a restoration a pulse of positive polarity and of about 100-millisecond duration is impressed by the Console involved on conductor PBA. S1 is then energized through contact S2a and is locked in in circuit 200L, C1e or C2e, S1a, S2, S1, TN. After the pulse is terminated, S2 is actuated to open S2a.

*S3—unactuated in stand-by*

This relay and S1 sets the step switch SST for transmitting two pulses on the second digit to command the remote-printer to print red. On the occurrence of an abnormality positive pulses, (100 ms.) duration, are impressed by the associated Console both on PBA and PRA. Relay S1 is actuated through back contact S2a and relay S3 through its back contact S3a and both are locked in, relay S1 in circuit 200L, C1e, S1a, S2, S1, TN and relay S3 in circuit 200L, C1e or C2e, S3b, S3, TN.

*Relay S2—unactuated in stand-by*

This relay cooperates with S1 to prevent mal-operation by repeated signals on PBA.

*Relay NPS—unactuated in stand-by*

This relay causes the Area Panel involved to continue cycling its step switch to repeat the intelligence of an abnormality or restoration until the remote printing is completed. The NPS relay remains actuated as long as the C1e or C2e remain closed; that is, as long as the Transmitter has not completed the transmission. The actuation of the NPS relay actuates and RPC relay in the signaling circuit of the Console involved and this circuit continues to signal back to the associated Area Panel that the intelligence has not been printed. (See FIG. 2A this application; FIG. 3A Suozzo application.)

Figure 2B:
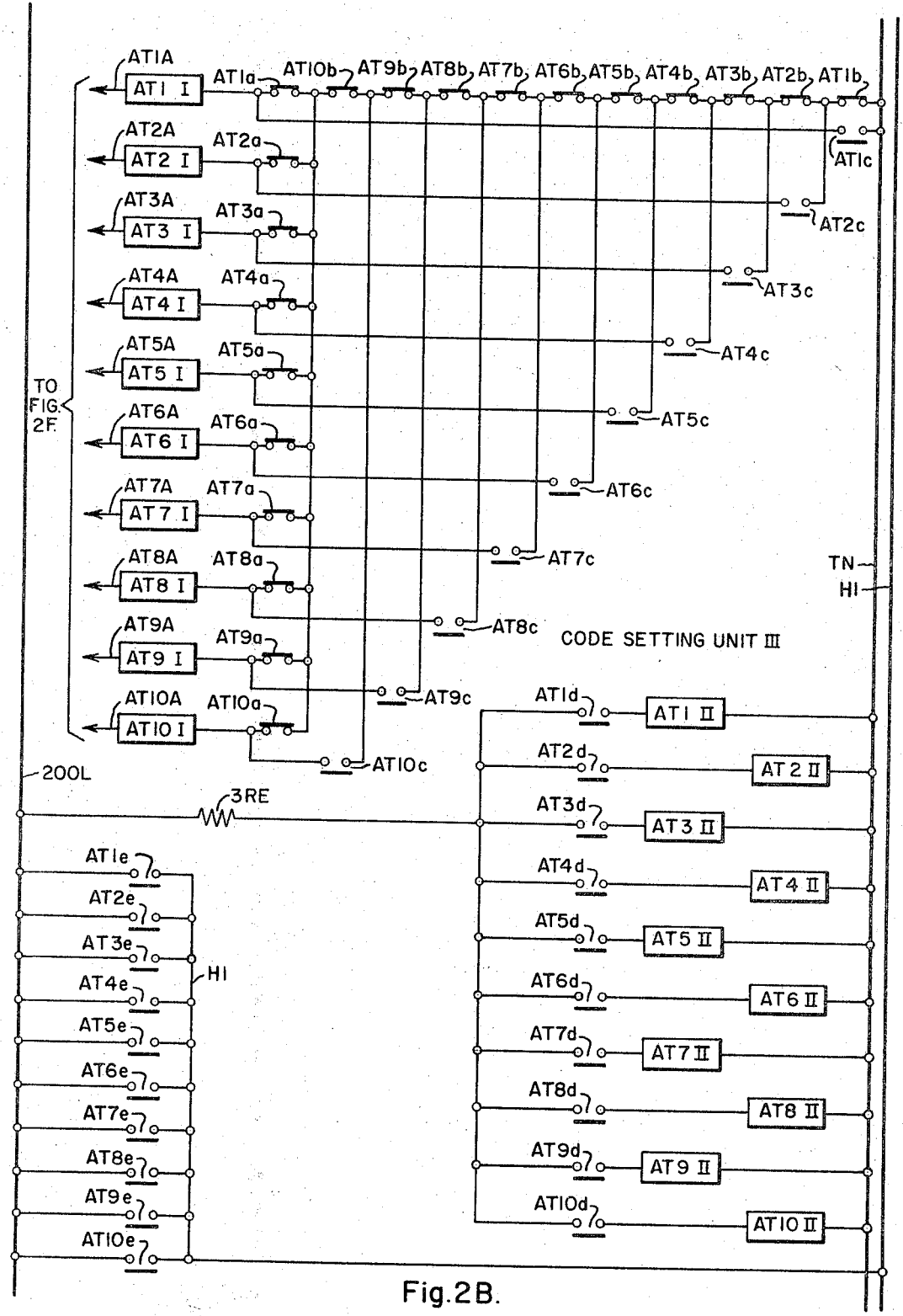

The Code Setting Unit III includes the relays AT1 through AT10 (FIG. 2B).

*Relays AT1 through AT10—two-coil relays—unactuated in stand-by*

These relays set step-switch SST for transmitting a number of pulses in the third digit of the code equal to the tens place in the number of an area in which an abnormality or restoration has occurred. Each of these relays has two coils one labeled I and the other labeled II. Each relay is actuated by flow current through the coil designated by I and is held in actuated condition through a d contact by the coil designated II. Actuation of any one of these relays prevents actuation of the other relays of the chain. When one of these AT relays is actuated, the corresponding f contact (FIG. 2G) connected to a corresponding SSTd contact of the step switch SST is opened and the step switch is conditioned to count a number of pulses corresponding to the tenth place of the number of the area. Actuation of one of the AT relays also closes an e contact to impress power on conductor H1 which permits current to flow through the coil T1.

Figure 2C:
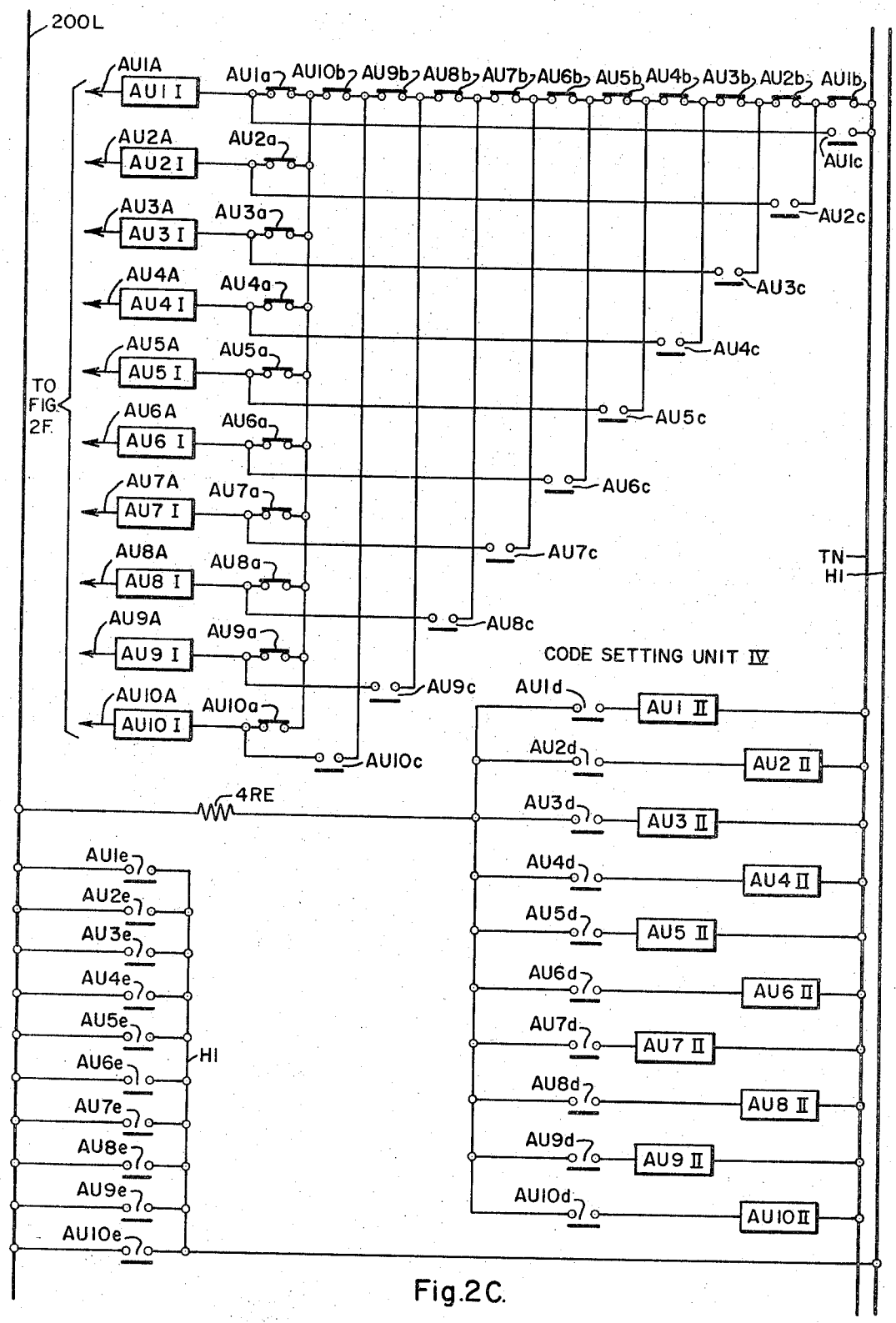

The Code Setting Unit IV includes the relays AU1 through AU9 (FIG. 2c).

*Relays AU1 through AU10—two-coil relays—
unactuated in stand-by*

These relays set step switch SST for transmitting a number of pulses in the fourth digit of the code equal the units place of a number of the area in which an abnormality restoration has occurred. These relays are similar to the relays AT1 through AT10 having two coils labeled I and II and are analogously connected.

---

Figure 2D:
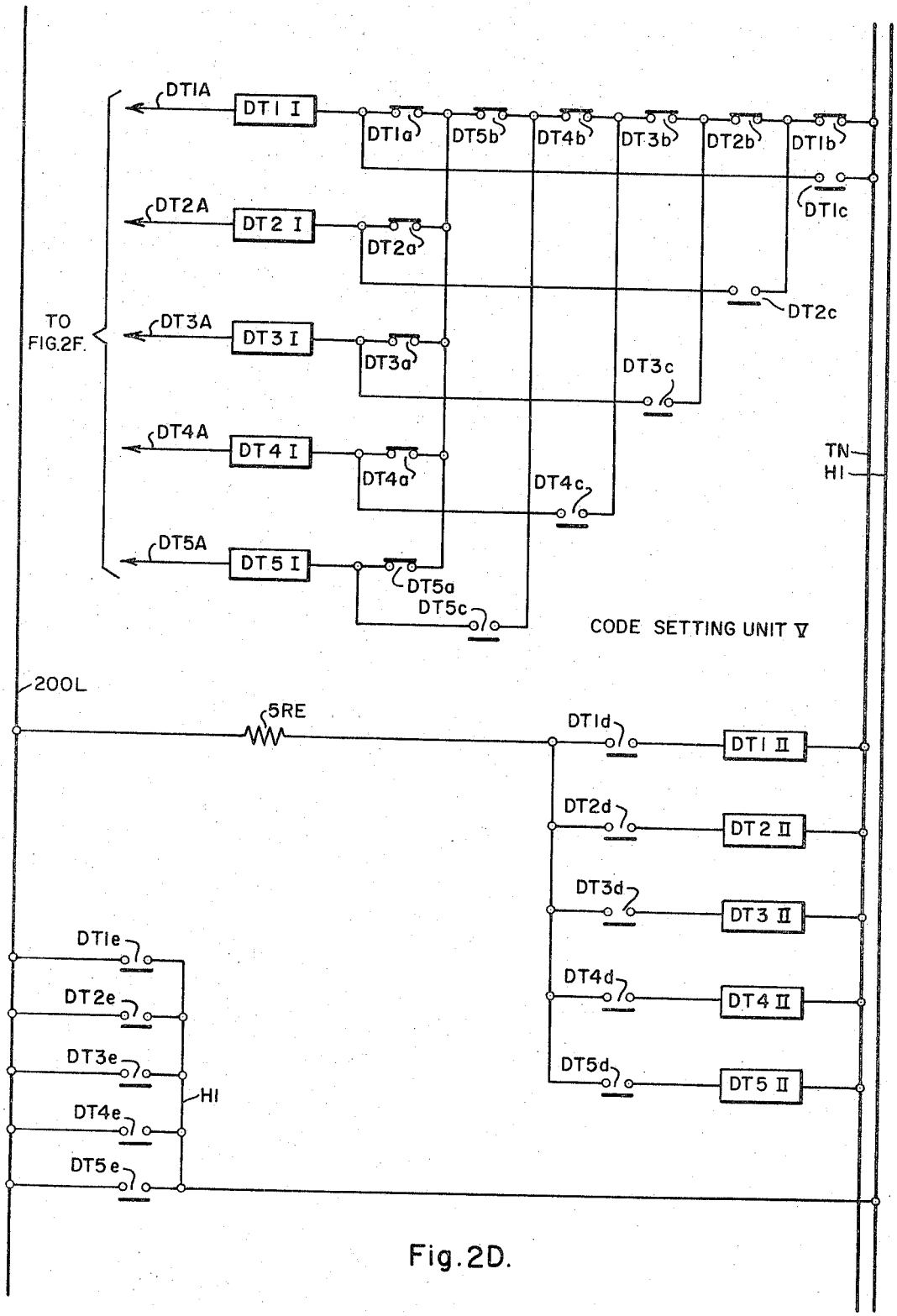

Code Setting Unit V includes relays DT1 through DT5 (FIG. 2D).

*Relays DT1 through DT5—two-coil relays—
unactuated in stand-by*

These relays set step switch SST for transmitting a number of pulses in the fifth digit of the code equal to the tens place of the detector DE or DES which picks up an abnormality or restoration. The coils of relays DT1 through DT5 are labeled I and II and are connected similarly to the relay AT1 through AT10 and AU1 through AU9.

---

Figure 2E:
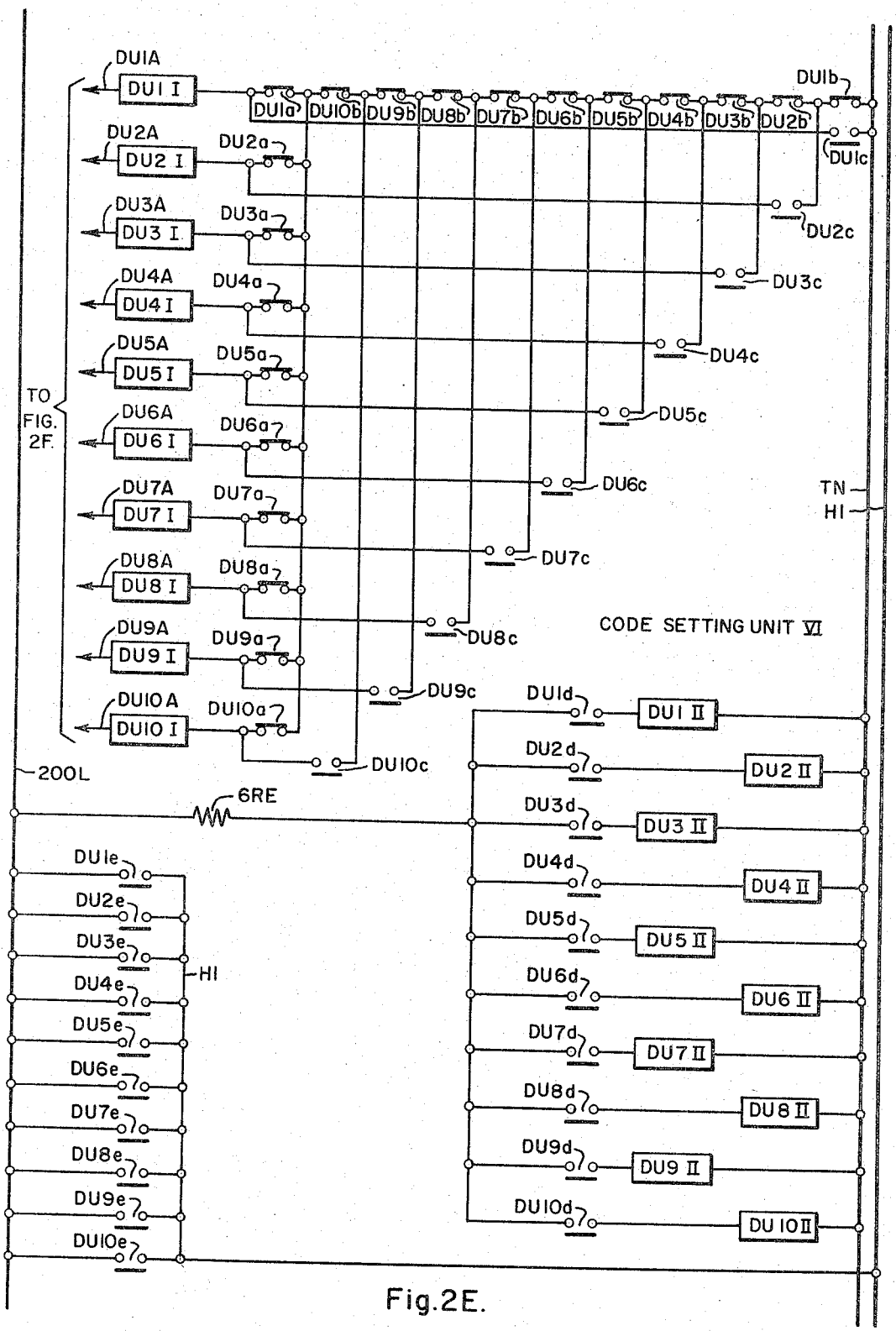

Code Setting Unit VI sets the number of pulses in the sixth digit of the code. This unit includes the relays DU1 through DU10 (FIG. 2E).

*Relay DU1 through DU10—two-coil relays—
unactuated in stand-by*

These relays set step switch SST for transmitting a number of pulses, in the sixth digit of the code, equal to the units place of the number of a detector DE or DES which responds to an abnormality or a restoration. These relays are connected similarly to the AT, AU and DT relays.

---

Figure 2F:
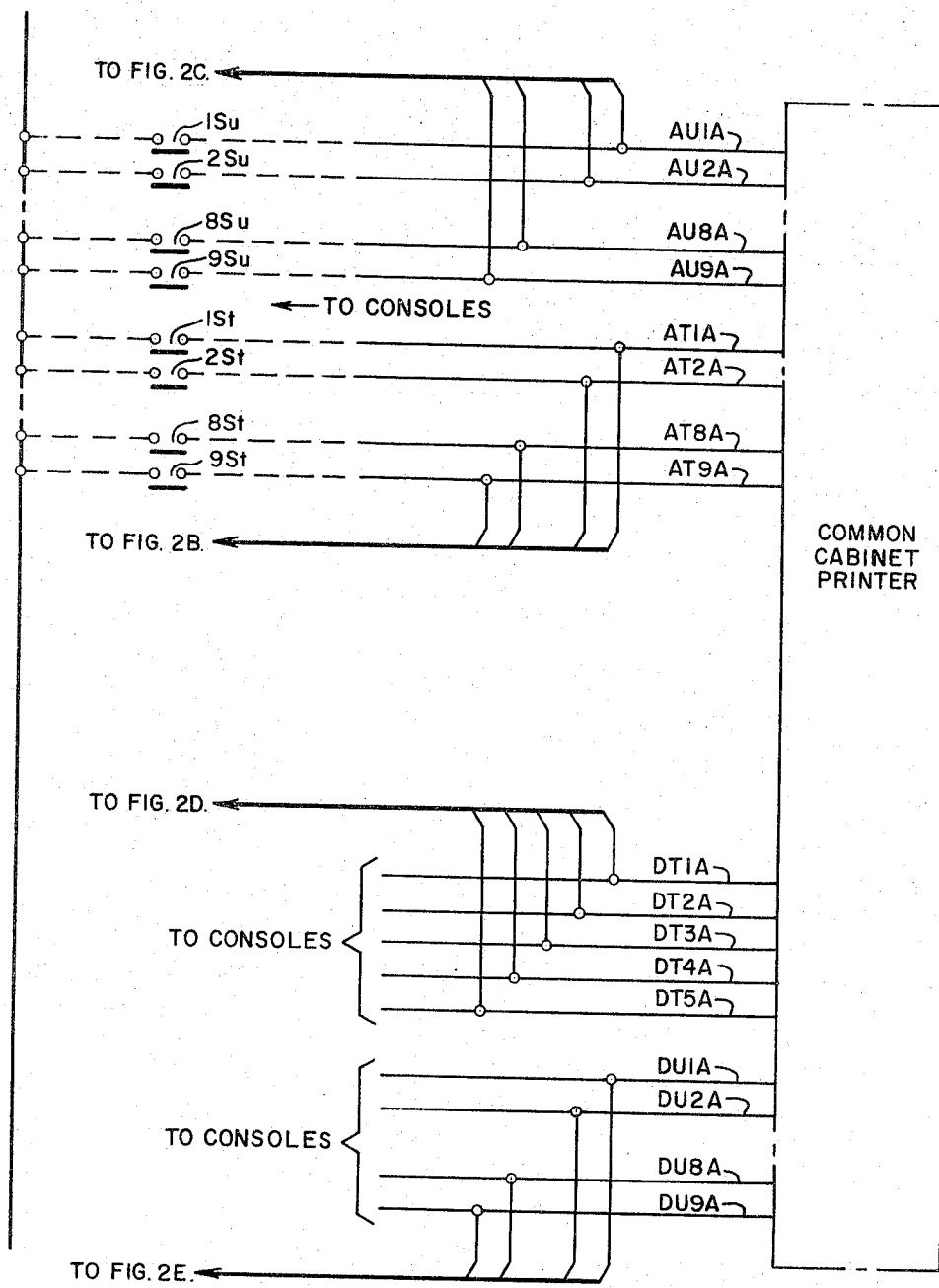
Figure 2G:
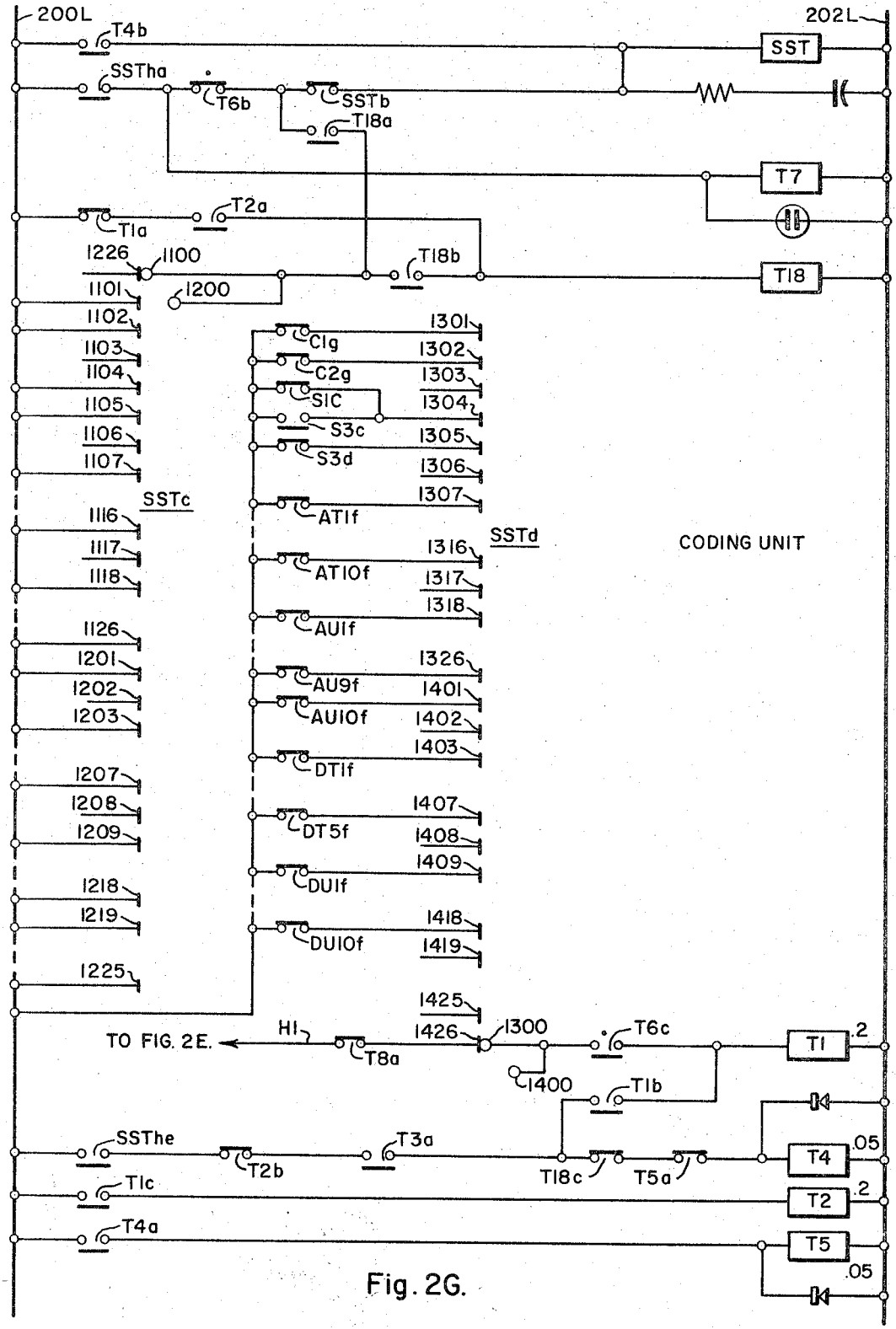
Figure 2H:
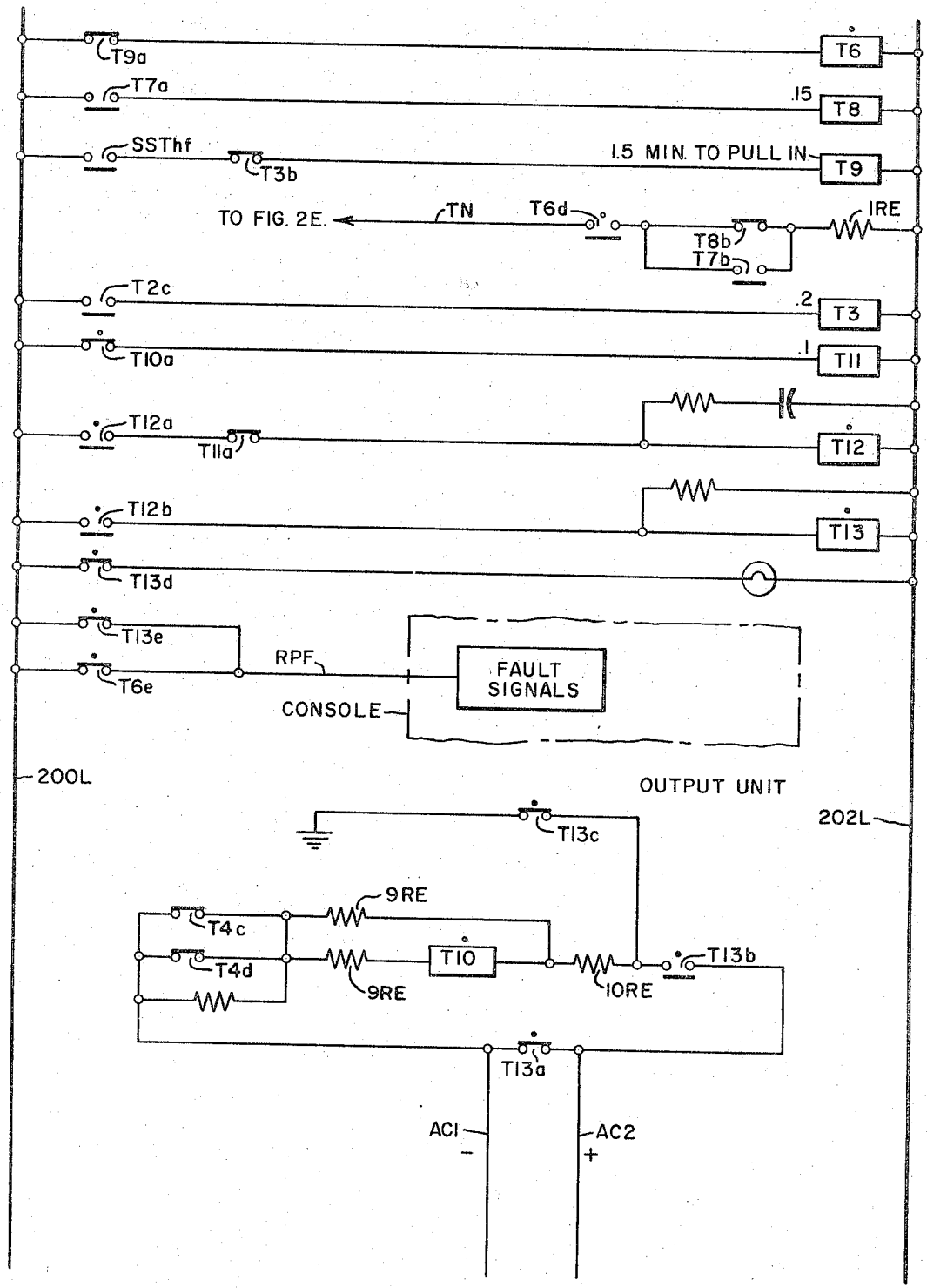

The Output Unit includes the relays T10, T11, T12, T13 (FIG. 2H).

*Relay T10—actuated in stand-by*

This relay detects defects in communication channel. When a defect occurs T10 becomes deenergized and drops out energizing T11 which in turn deenergizes T12, T12 deenergizes T13 providing an alternative communication channel to the loop AC1–AC2.

*Relay T11—slow drop-out—unactuated in stand-by*

This relay provides an alternative channel on the occurrence of a defect in the primary communication channel. In this case T10 drops out actuating T11.

*Relay T12—actuated in stand-by*

This relay cooperates with T10 and T11 to provide the alternative communication channel. This relay is actuated by the installation or service personnel when the apparatus is set for operation. For this purpose, the contact T12a is held closed locking the relay in through T11a. When the defect in the primary communication loop occurs a signal appears. The apparatus must then be serviced and set back in normal operation by holding T12a closed.

*Relay T13—actuated in stand-by*

This relay cooperates with the relays T10, T11 and T12 to provide the alternative communication channel. With relay T13 actuated, the communication is along the loop AC1 and/or AC2 and through ground.

---

The Receiver and Remote-Printer includes an Input Unit, a Step Switch Sequencing Unit, a Resetting Unit, a Step Switch Unit, Decoding Unit I, Decoding Unit II, Decoding Unit III, Decoding Unit IV, Decoding Unit V and Decoding Unit VI.

The Decoding Units decode the code received from the Transmitter and transmits the intelligence to the remote printer to print the data. Each Decoding Unit I through VI corresponds to a Code Setting Unit I through VI of the Transmitter. The Decoding Units I through VI sequentially decode the digits I through VI of the code.

---

The Input Unit includes the relays RP1, RP2, RP3, RP4 and RP5 (FIG. 3a).

The Receiver and Remote-Printer has a number of relays the functions of which are described in detail in the following paragraphs.

*Relay RP1—slow drop-out—actuated in stand-by*

This relay functions to detect an open circuit or a short circuit in the conductors AC1 and AC2 on the receiver side of the communication channel. The relay is energized by the current which flows through the communication-channel conductors AC1 and AC2. During the signaling when the current is reduced from 0.0394 milliampere to 0.0057 milliampere, the relay remains actuated continually. The relay only drops out if the communication channel is open circuited or short circuited.

*Relay RP2—two-coil relay—unactuated
during stand-by*

This relay repeats the pulses in the digits of the code and actuates the step switches R1 through R6 (FIG. 3B) to decode each of the respective digits. Typically, each of the coils, RP2I and RP2II, of RP2 may be of 170 ohms and may be wound with 5100 turns. Each winding is connected in circuit with 1100 ohms external resistance. The windings I and II are connected so that their ampere turns are opposed and in the absence of received signals relay RP2 while energized is unactuated. During each pulse of each digit the current in the communication channel is reduced from 0.0394 milliampere to 0.0057 milliampere for an interval of about 60 milliseconds. The ampere turns in RP2I is then reduced to 27 while the ampere turns in RP2II remains at 205 so that the relay is actuated to repeat each pulse.

*Relay RP3—slow drop-out—unactuated
in stand-by*

This relay (FIG. 3B) operates to provide a time interval between reception of digits of the code from the Transmitter. This relay also cooperates in the sequencing of the Step Switch Sequencing Unit by operation of contact RP3a.

*Relay RP4—slow drop-out—unactuated in
stand-by*

This relay cooperates with relay RP20 of the Resetting Unit to reset the apparatus after the transmission of a code.

*Relay RP5—actuated in stand-by*

When this relay is actuated, the communication channel is set to communicate over the conductors AC1 and AC2. When a fault or an open circuit occurs, this relay drops out setting the apparatus to operate over an alternative channel, between the conductors AC1 or AC2 or both, and ground. This relay is actuated by the service or installation personnel when the equipment is set into operation. The contact RP5d is held closed after RP1a is closed and the relay is actuated and locked in through RP1a, RP5d and RP25a.

The Step Switch Sequencing Unit includes the relays RP6 through RP19.

*RP6 through RP19—unactuated in stand-by*

These relays are actuated in sequence to cause the step switches R1 through R6 to operate in sequence. The odd numbered relays RP7, RP9, RP13, RP15, RP17 and RP19 are actuated during the interdigit interval to condition succeeding step switches R2 through R6 respectively, to be stepped, each in its turn. The pulsing takes place through the back c contacts of these odd numbered relays before these relays are in their turn actuated. All the step switches R1 through R6 are stepped through the back contact of one of these odd numbered relays each in its turn as relay RP2 is energized and deenergized responsive to the 60-millisecond pulses of each digit of the code. The first step switch R1 is caused to step through contacts RP2a and RP7c. The other step switches R2 through R6 are stepped, each in its turn, through the RP2a contact and the d contact of the relay through the back contact of which the preceding step switch is stepped and through a back contact of the next odd numbered RP relay. The sequencing from one odd numbered RP relay to the other is effected by the even numbered relays. Thus, initially RP6 is actuated in turn conditioning RP7 to be actuated at RP6a. RP7 is actuated during the interdigit interval when RP3 drops out. At the start of the next digit RP8 is actuated conditioning RP9 to be actuated. RP9 is actuated when RP3 again drops out during interdigit interval. The other RP switches RP6 through RP19 operate similarly.

---

The Resetting Unit includes the relays RP20 through RP24. Of these, relays RP23 and RP25 cooperate to produce a resetting operation on the occurrence of a defect in the apparatus.

*Relay RP20—unactuated in stand-by*

This relay (FIG. 3A) causes the printing operation to be carried out after the code has been set in step switches R1 through R6. This relay also starts the resetting operation of the Resetting Unit. This relay is actuated following actuation of RP18 and deenergization of RP3 and RP4. RP20c through RP20h close (FIG. 3C) and the printing is carried out.

*Relay RP21—slow drop-out—unactuated in stand-by*

This relay cooperates with relay RP20 to carry out the resetting operation. When RP20 is actuated, RP21 is actuated. When relay RP20 is deenergized on the opening of RP3b and RP4a, RP20b closes and RP21a being closed RP22 is energized and actuated.

*Relay RP22—unactuated in stand-by*

This relay operates to reset the apparatus. When this relay is actuated it is locked in through its lock-in contact RP22a and any of the contacts R1hb through R6hb of the step switches R1 through R6. These hb contacts are closed so long as the associates step switch is away from home. RP22 is also energized when RP23 is actuated closing its contact RP23a and performing its resetting operation if any of the step switches R1 through R6 stick.

*Relay 23—slow pull in (15 sec. to 2 min.)—unactuated in stand-by*

If any of the step switches stick, relay RP23 would be energized for a long interval and would become actuated actuating relay RP22 to reset the apparatus.

*Relay RP24—slow pull in—unactuated in stand-by*

On the sticking of a step switch, this relay operates a signal and produces a display to indicate a defect.

*Relay RP25—slow pull in (15 sec. to 2 min.)*

On the occurrence of a short circuit of the line conductors AC1 and AC2, relay 2 would be actuated closing RP2a. If the short circuit persists relay RP25 would be actuated. Contact RP25a would then open deenergizing relay RP5 and the communication channel would be set to communicate between the conductors AC1 and AC2 and ground.

The Step Switch Unit includes the step switches R1 through R6. Each of these step switches is operated to decode a digit of the code. Separate step switches are used rather than a single step switch to eliminate the memory relays which would be necessary if a single step switch similar to SST of the Transmitter were used. Under such circumstances memory relays analogous to C1, C2, S1, S3, AT1 through AT10, AU1 through AU9, DT1 through DT5 and DU1 through DU9 would be necessary.

Each step switch R1 through R6 has a pair of contacts R1ha through R6ha and R1hb through R6hb; these may be described as homing contacts. When any of these step switches are at home, the ha and hb contacts are open and when any of these switches is away from home, these ha and hb contacts are closed. In addition, the step switches R1 through R6 have a self-homing or self-stepping contact R1c through R6c. The coil of each step switch R1 through R6 may be energized through a contact RP22b through RP22g. On each energization of a coil the associated c contact is opened causing the coil to be deenergized and the switch to advance a step. The reclosing of the c contact causes this operation to be repeated.

---

Decoding Unit I includes contacts 101, 102 and 103 of step switch R1 and contact RP20d (FIG. 3C).

---

The Decoding Unit II includes the contact RP20c and the relays RP10 and RP11.

*Relays RP10 and RP11—unactuated in stand-by*

These relays (FIG. 3C) control the color of the printing. When two pulses are received in the second digit of the code the wiper 200 of R2d stops in engagement with 202 and when RP20c is closed after the code is received RP10 is actuated and the Remote Printer prints red through RP10d. For one pulse R2d stops at 201 and RP11 is actuated and the printer prints black through RP11b and RP11c.

---

The Decoding Unit III includes the contact RP20e and the contacts R3d of step switch R3. The step switch R3 steps off a number of steps equal to the tens place of the number of area where the abnormality occurred and when RP20e closes the corresponding number is printed in the tens place of the number of the area.

---

The Decoding Unit IV includes the contact RP20f and the contacts R4d of the step switch R4. The step switch R4 in its turn operates to step off a number of steps equal to the units place of a number of the area in which the abnormality occurred and this is printed in the units place when RP20f closes.

---

The Decoding Unit V includes the contact RP20g and the contact R5d of step switch R5. This operation is similar to that of R3d and R4d. The Decoding Unit VI includes the contacts RP20h and R6d of the step switch R6.

*Transmitter stand-by*

During stand-by, power is supplied to the supply conductors 200L and 202L, relays T10, T12 and T13 are actuated. Current flows through the loop AC1 and AC2. Typically, this current may be of the order of .0394 milliampere. T6 is also actuated, because T9 is unactuated, and a negative potential is impressed on TN in the following circuit 202L, 1Re, T8b, T6d (FIG. 2H). Negative potentials are then applied through TN to the negative terminals of the Code Setting Unit VI, Code Setting Unit V, Code Setting Unit IV, Code Setting Unit III, Code Setting Unit II, Code Setting Unit I. In addition, the RPC conductor (FIG. 2A) is conditioned to receive positive potential, on the actuation of relay NPS, through the closed contact T6a.

Transmittal operation

For purpose of explaining the operation, assume that a fire originating in the area covered by area panel 26 is detected by detector 49. As disclosed in the Suozzo et al. application 322,242, the information as to the abnormality is printed on the local printer which is in the Common Cabinet Printer by the cooperation of Console 26. This Console causes a pulse typically of a 100-millisecond duration and of positive polarity to appear on the inputs to the Common Cabinet Printer and also at the following terminals of the Transmitter.

| Terminal: | Significance |
|---|---|
| FA | Fire. |
| PBA, PRA | Print in red ink. |
| AT2A | The number of area is in the twenties. |
| AU6 | The number of the area is 26. |
| DT4A | The number of the detector is in the forties. |
| DU9A | The number of the detector is 49. |

The impressing of the pulse on FA causes coil C1II to be energized in the following circuit: FA, C1II, C1c, C2d, C1d, TN. C1 is actuated and C1II is locked in through C1b and the energization of relay C2 is prevented by the opening of contact C1d. So long as the 100-millisecond pulse persists, there is positive potential both on 200L and on FA (on both sides of C1I) and C1I remains deenergized. At the end of the 100 milliseconds, the positive potential on FA disappears and C1I is energized in the following circuit: 200L, 2Re, C1a, C1I, C1b, TN. At this time, C1c is open, coil C1II is then deenergized and the relay remains locked in through C1I.

The opening of C1c does not affect the energization of C1II because it is locked in through C1b so long as the pulse on FA persists. After this pulse, the relay C1 remains locked in by the energization of the coil C1I. The locking in of C1I gives the Transmitter the facility of a memory as to the fire alarm signal.

The impressing of the 100-millisecond pulse on PBA causes relay S1 to be energized in the following circuit: PBA, S2a, S1, TN. Contact S1a closes, and C1e is also closed but as long as the 100-millisecond pulse persists S2 remains deenergized. At the end of the 100-millisecond pulse, S2 is energized in series with S1 in circuit; 200L, C1e, S1a, S2, S1. Energization of S1 also causes relay NPS to be energized in circuit PBA, S1b, NPSa, NPS, TN. Relay NPS is locked in, after the 100-millisecond pulse stops in circuit; 200L, C1e, NPSb, NTS, TN.

The pulse on PRA causes S3 to be energized in circuit: PRA, S3a, S3, TN and S3 is locked in circuit: 200L, C1e, S3b, S3, TN. With NPSc closed, relay RPC is energized in the following circuit: 200L, NPSc, T6a, the RPC Conductor to Console 26 (see Suozzo et al. application FIG. 3A). Contact RPCa is then opened. This contact is in series with contact Ga of Console 26. At the end of the local printing operation, Ga recloses so that, with RPCa not in the signaling circuit of the Console 26, a pulse of reduced current is transmitted from Console 26 to Area Panel 26 (Suozzo application). Such a low pulse would indicate that the printing has been completed and that the stepping in Area Panel 26 should discontinue at the home position of the step switch SS. But the actuation of RPC opens RPCa so that the pulse transmitted is a pulse of zero current in effect telling the Area Panel that the printing is not completed. The step switch SS in the Area Panel 26 then continues to step retransmitting the data as to the fire and the other data until the printing is complete and RPC is deenergized (by opening of NPSc) and drops out. This facility affords time for the remote printing of a second abnormal condition after the first was printed.

The 100-millisecond pulse also appears on conductor AT2A (FIG. 2F). Relay AT2 is actuated in circuit AT2A (FIG. 2F) AT2I, AT2a, AT10b, AT9b, AT8b, AT7b, AT6b, AT5b, AT4b, AT3b, AT2b, AT1b, TN. The relay AT2 is locked in circuit 200L, 3Re, AT2d, AT2II, TN. Actuation of any other AT relays is prevented by the opening of AT2b. When the 100-millisecond pulse disappears from AT2A, the Coil AT2I is deenergized but the relay remains locked in through AT2II.

Similarly, relay AU6 is energized through coil AU6I and locked in through coil AU6II and contact AU6d and resistor 4Re. DT4 is also energized through coil DT4I and locked into through resistor 5Re, DT4d, DT4II. DU9 is energized through DU9I and locked in through resistor 6Re, DU9d and DU9II.

The above-described relay network is essentially a memory network which enables the Transmitter to remember the data to be transmitted to the remote printer. The data is transmitted in digits of a code in succession.

The actuation of the C1 applies power to H1 through C1f (FIG. 2A) and through H1 to the coil of T1 in the following circuit: 200L, C1f, H1, T8a, 1426, 1300 (home position of SSTd), T6c, T1, 202L. Relay T2 is energized through T1c and immediately actuated. Relay T3 is energized through T2c and immediately actuated. T4 is actuated in circuit 200L, C1f, H1, T8a, 1426, 1300, T6c, T1b, T18c, T5a, T4, 202L.

T5 is energized through T4a, T4 is then deenergized at T5a. Relays T4 and T5 thus teeter-totter. On the energization of T4, the coil of SST is energized through T4b. On the energization of T5a, the coil of SST is deenergized and the step switch SST is advanced one step. The wiper contact 1400 moves into engagement with 1301. Contact 1301 is disconnected at C1g which is open. T4 then does not become reenergized through T5a, T18b, T1b, T6c, 1300, 1301. The advance of the step switch is then temporarily stopped.

While T4 is actuated, T4c and T4d in the communication channel (FIG. 2H) are opened so that the current through conductors AC1 and AC2 is reduced. Typically, the current may be reduced from 0.0394 milliampere to 0.0057 milliampere. A negative going pulse, typically of 60 milliseconds duration, is then impressed on conductors AC1 and AC2. This pulse is the contents of the first digit of the code.

When step switch SST advances to the first step a circuit is closed through 200L, SSTHe, T2b, T3a, T18c, T4, 202L. This circuit functions during the interdigit interval when T1, T2 and T3 are deenergized in succession.

With the circuit from H1 through T1 open at 1301, relay T1 is deenergized, relay T2 is deenergized and relay T3 is deenergized. There is a delay of several hundred milliseconds between the deenergization of T1 and the deenergization of T3. With T3 deenergized, T3b is closed. In the first step of SST, SSTHf is also closed and T9 is energized. But T9 does not become actuated for about 1½ minutes. Unless the apparatus sticks at this point for more than 1½ minutes, T9 does not become actuated.

When T1 became deenergized, T1a closed. At this point, T2a was also closed because of the delay in the dropping out of T2 after its coil became deenergized. T18 is energized in circuit 200L, T1a, T2a, T18, 202L and is locked in. At this point, the wiper 1100 of bank SSTc is at 1101 so that T18 is locked in through T18b, wiper 1100 and contact 1101.

The coil of SST is then energized in circuit 200L, 1101, 1100, T18a, SSTb, SST, 202L (1100 had advanced to 1101 with 1300). SSTb is then opened and the step switch advances one step. The wiper 1300 of SSTd is then at 1302 and the wiper 1200 of SST*c* at 1102. The time taken for the wiper 1100 to step from 1101 to 1102 is not sufficient to deenergize T18 so that T18*b* remains closed and T18 remains locked in. When the step to 1102 is completed, the coil of SST is again energized and the wiper 1100 is stepped from 1102 to 1103 and wiper 1300 from 1302 to 1303. At this point the lock-in circuit for T18 is opened at 1103 and T18 is deenergized. The wiper 1300 of bank SST*d* is now at 1303 ready to start the transmission of the second digit.

The release of T1, T2 and T3 in tandem provides an interval of about 200 milliseconds during which the Receiver and Remote Printer performed their interdigit switching. This switching is carried out in an interval typically of about 60 milliseconds.

When relay T2 is deenergized during the tandem operation of T1, T2, T3, T2*b* closes but at the instant when T2*b* is closed T3*a* is still actuated although its coil is deenergized. SST*he* is closed at this point since the step switch SST is away from home. T3*a* is still closed. T4 is then energized in circuit 200L, SST*he*, T2*b*, T3*a*, T18*c*, T5*a*, T4, 202L. T4 causes T5 to be energized which in turn causes T4 to be deenergized. T4 and T5 teeter-totter again.

When the wiper 1300 moves to 1304, T1 is energized through H1 and T6*c*. T1 energizes T2 at T1*c* and T2 energizes T3 at T2*c*. As the wiper moves from 1303 to 1304 and then to 1305, T1, T2 and T3 remain energized. When T3 is energized during the transmission of the pulses of the second digit, T9 is reset to its initial position.

With T1 energized and actuated, the following circuit is provided for T4, 200L, S1*f* and S3*f*, H1, T8*a*, 1304, 1300, T6*c*, T1*b*, T18*c*, T5*a*, T4, 202L. With the wiper 1300 at 1304, T4 is then reenergized on the reclosing of T5 when it is deenergized and the wiper 1300 is moved a second step to 1305 where the circuit is opened at S3*d*. At this point, the above-described operation is repeated.

The stepping of the wiper 1300 from 1303 to 1304 and from 1304 to 1305 causes the transmission of two pulses along the conductors AC1 and AC2. After the second pulse is transmitted, T18 is again energized causing the stepping of the step switch until wiper 1100 is at contact 1106.

The above-described operation is repeated for the third, fourth, fifth and sixth digits of the code. At the third digit, the wiper 1300 moves from 1306 to 1307 stopping at 1308 where the AT2 contact is open. Two pulses are transmitted. Then by the operation of T18, the switch SST is stepped automatically until T18 is deenergized at contact 1117 of SST*c*. Thereafter, the wiper 1300 of the step switch SST steps through contacts 1318 through 1323 stopping at 1323 where the AU6 contact is open. The same operations are repeated for the fifth and sixth digits of the code. The pulses corresponding to these digits are transmitted over the loop including conductors AC1 and AC2.

After the sixth digit is transmitted, T1, T2 and T3 are deenergized in tandem. T18 is actuated then causing SST to motorize to the home position. While SST is away from the home position, the SST*ha* is closed, T7 is energized and T8 is actuated through T7*a*. When the switch SST reaches the home position, SST*ha* opens deenergizing T7. T7*b* in the circuit of TN opens. T8 remains energized, typically for about 150 milliseconds, after T7 drops out. T8*b* is then opened and TN is deenergized so that the relays CS, AT, AU, DT and DU, which were energized to provide the memory of the signals, become deenergized. Relay T1 is maintained deenergized at open T8*a*. Then T1, T2, T3, T4, T5, T7 and T8 and step switch SST are all deenergized and the apparatus is reset.

As is explained in Suozzo et al. application 322,242, the Consoles are interlocked through the V relays V–1*e*, V–2*e* and the like (FIG. 3G Suozzo, top). This interlock prevents the Transmitter from receiving intelligence from more than one Console. The intelligence from the different Consoles is transmitted in succession and it is impressed on the Transmitter in succession and the data is coded in succession. A V relay corresponding to any Console is held actuated by the conductor RPT through V–1*x*, V–2*x*, V–3*x*, etc., until the transmission of the intelligence of this Console is coded and completely transmitted to the Receiver And Remote Printer. Conductor RPT is connected to H1 and remains energized until the transmission is complete.

If conductors AC1 or AC2 opens or if conductors AC1 and AC2 are shorted, the current through relay T10 is interrupted. T11 is energized at T10*a* and relay T12 deenergized at T11*a*. Relay T13 is deenergized at T12*b*. Conductors AC1 and AC2 are then connected together at T13*a* and a ground circuit is established through T13*c*. T10 is then reenergized and the transmission continues between conductors AC1 or AC2 or both and ground. When T13 drops out, T13*e* closes (FIG. 2H) and a signal indicating the fault or the open circuit is transmitted through conductors RPF and appears on the Common Cabinet Printer. T12 must then be manually reset by a serviceman.

*Receiver and Remote Printer—Stand-by*

During stand-by the relay RP5 is actuated. RP5*a* is then open and RP5*b* is closed. Current flows in circuit (FIG. 4) 100L, 8RE, RP5*a*, AC1, T4*c* and T4*d*, 9RE, T10, 10RE, T13*b*, AC2, RP1 and RP2I, 101L. Current also flows in circuit: 100L, 12RE, RP2II, 101L. The balancing impedance between RP2I and RP2II is such that the ampere turns through these relays are counterbalanced and RP2 is unactuated. RP3, RP4 and RP6 through RP9 and RP12 through RP25 are also unactuated. The step switches R1 through R6 are in the home position. RP10 and RP11 are unactuated.

*Receiver and Remote Printer—Operation*

As the wiper 1300 of the step switch SST in the Transmitter steps, negative going pulses typically of 60 milliseconds duration are transmitted during each of the six digits. Typically these pulses decrease from a base of 0.0394 milliampere to 0.0057 milliampere takes place during the 60 milliseconds. The pulses transmitted in each digit and their indication are presented in the following table.

| Digit No. | Number of Pulses | Indication |
|---|---|---|
| 1 | 1 | Fire (critical abnormality). |
| 2 | 2 | Print Red. |
| 3 | 2 | Abnormality occurred in an area numbered in the twenties. |
| 4 | 6 | Abnormality occurred in area 26. |
| 5 | 4 | A detector numbered in the forties picked up abnormality. |
| 6 | 9 | Abnormality picked up by detector 49. |

The pulse rate of the pulses in each of the digits is typically at about 10 pulses per second during pulsing.

The reduction of the current in the single pulse of digit 1 reduces the current in RP2I and relay RP2 is actuated. Relay RP3 is then actuated. Relay RP3 remains actuated for about 150 milliseconds after its coil is deenergized by the re-opening of RP2*a* (FIG. 3B). On the operation of RP3, RP4 is energized through RP3*a*. RP4 remains energized about 150 milliseconds after RP3*a* re-opens. When RP2 is actuated and the coil of the step switch RL is energized in circuit: 100L, RP2*a*, RP7*c*, R1, 101L. R1 then advances one step setting the printer to print the word "fire" or a symbol for fire (Printing Unit I). After sending the digit 1 the transmitter T delays for about 200 milliseconds during which the tandem chain of relays T1, T2, T3 open. During this interval following the single pulse of digit 1, RP3 opens but RP4 remains actuated, typically for about 100 milliseconds, after its coil is deenergized. The operation of RP3 actuates RP6 in circuit: 100L, RP3a, RP7a, RP6, 101L. With the step switch R1 away from the home position R1ha is closed. When RP3 becomes deenergized and RP3a opens, RP7 is energized in series with RP6 in circuit: 100L, R1ha, RP6a, RP7, RP6. An energizing circuit through RP3a and RP7b is thus prepared for RP8. In addition RP7b is closed conditioning R2 to be energized during the next pulsing operation of RP2.

In addition when RP4 is deenergized, relay RP23 is energized through RP4b and RP6b. RP23 is a dash-pot relay and may be set to become actuated and operate its contacts after it is energized for an interval of between 15 seconds and 2 minutes. During proper operation RP23 may be disregarded since RP4 is deenergized at intervals of the order of 150 or 200 milliseconds and RP23 remains unactuated.

After RP4 drops out the pulse of the second digit is received. RP2 is then again actuated and the coil of R2 is energized in circuit: 100L, RP2a, RP7d, RP9c, R2, 101L. When RP2 is deenergized at the end of the pulse the wiper 200 of R2 is advanced one step to the contact 201. Relay RP11 is conditioned to be energized through RP20c, 200, 201. But two pulses are received and wiper 200 moves to contact 202.

After the second pulse of the second digit has been received relay RP8 is actuated in circuit: 100L, RP3a, RP7b, RP9a, RP8, 101L. When RP3a is re-opened RP9 is energized in series with RP8 in circuit: 100L, R2ha, RP8a, RP9, RP8, 101L. RP9b then closes preparing the circuit for RP12. In addition R3 is conditioned to be stepped responsive to the pulsing of RP2a during receipt of the third digit through RP7d, RP9d, RP13c.

The third digit contains two pulses operating RP2a twice. This causes the wiper 300 of R3d to advance to contact 302 conditioning the printer to print a 2 as the "tens" place of the number of the area in which the abnormality occurred.

Also a circuit is prepared for operating R4 and subsequently R4 is operated to advance its wiper 400 six steps and a circuit is prepared for R5. R5 and R6 are operated similarly to the others. Now the memory circuit is fully conditioned to actuate the Remote Printer to print the data.

When a circuit is prepared for R6, RP18 is energized in circuit: 100L, RP3a, RP7b, RP9b, RP13b, RP15, RP17b, RP19a, RP18, RP19a, RP18, 101L. RP18b is then closed. Subsequently RP3b is reclosed and RP4a remains closed. RP20 is then actuated. The first, third, fourth, fifth and sixth items of data are printed directly. Relay RP10 is actuated through RP20c and the Printer is conditioned to print read through RP10d.

After printing the data the Receiver And Remote Printer is restored to the stand-by condition. The restoration is started by the actuation of RP20. When RP20 is actuated RP21 is actuated at RP20a. After the printing operation is completed RP4a, which remains actuated about 150 milliseconds after RP3a is opened, drops out. and RP20 is deenergized. RP20b is then reclosed and RP21a being closed RP22 is energized and locked in through contacts R1hb through R6hb. These contacts are closed for any of the step switches R1 through R6 that are away from home. With RP22 actuated the contacts RP22b through RP22g close and the step switches R1 are motorized home through the contacts R1c through R6c. Typically step switch R6 is motorized in circuit: 100L, R6ha, RP22g, R6c, R6, 101L. As each of the step switches reaches home the respective contacts R1ha through R6ha are opened stopping the motorizing of the step switch. The opening of R1ha deenergizes RP6 and RP7. The reopening of R2ha deenergizes RP8 and RP9. The reopening of R3ha, deenergizes RP12 and RP13. The reopening of R5ha deenergizes RP16 and RP17 and the reopening of R6ha deenergizes RP18 and RP19. With R1hb through R6hb now open RP22 is deenergized and the apparatus is reset.

*Defective operation*

One type of defective operation is the stopping of the stepping at any digit, either because of a defect or of a defect in the reception. Under such circumstances RP23 would remain actuated through RP4b and RP6b for the time interval of 15 seconds to 2 minutes for which it is set. Actuation of RP23 would actuate RP22 which would cause any step switches away from home to return to home to reset the apparatus. In addition, a signal indicating the interruption of the operation of the apparatus would be displayed on the energization of RP24 through RP24a.

The shorting of the lines AC1 and AC2 is another defective operation. This results in an increase in the current flowing in the circuit: 100L, 8RE, RP5a, the shorted line RP1, RP2I, 101L. Typically, the current increases from approximately 0.0394 milliampere to about 0.065 milliampere. The current through RP2I is then increased substantially and RP2 is actuated. RP3 is then energized by the closing of RP2a and RP25 is actuated through RP2a and RP7c. The coil of step switch R1 is energized through RP2a and RP7c. But since RP2 remains actuated RP2a remains closed and R1 does not advance a step.

RP25 is a dash-pot relay which is actuated to close its contact a time interval after it is energized which may vary from 15 seconds to 2 minutes. If the short persists RP25 is ultimately actuated. RP5 is then deenergized at RP25a reclosing RP5c. The conductors AC1 and AC2 are then set to operate through ground rather than as an ungrounded loop. The power supply circuit is as follows (FIG. 4): 100L, 13RE, RP5c, ground, T13c, 10RE, T10, T4c and T4d the shorted conductors AC1 and AC2, RP1, RP2I, 101L.

The ampere turns through RP2I and RP2II are now balanced so that RP2 is deenergized. Step switch R1 then advances one step. Relays RP3 and RP4 which were sequentially energized when RP2 was energized then sequentially release. Relay RP6 was energized when contact RP3a closed. When RP3a opens relay RP7 is energized in series with RP6 through the contact R1ha. On the deenergization of relay RP4, RP4b ultimately closes and RP23 is energized through RP5b and RP4b. RP23 remains energized for the time interval for which it is set actuating RP22. R1 then motorizes home through RP22b and R1c and the apparatus is reset to operate with AC1 and AC2 referenced to ground until the service people correct the short.

When AC1 or AC2 becomes open circulated RP2 is actuated by the energization of coil RP2II. RP3, RP4, R1, RP6 and ultimately RP7 are energized. RP23 is energized energizing RP22 and repeating the above operation. The apparatus is referenced to ground through the intact conductor AC1 and AC2 and RP5c at the Receiver and P13c at the Transmitter.

To aid in the understanding of this invention the following summary is presented:

This invention is a communication system including a Transmitter and a Remote Printer for remotely recording data of an abnormality in a protected region. The Transmitter serves to convert a six bit, 100 millisecond, parallel input to a local time-data Printer into automatic, six-digit decimal pulsing for transmission of data across a single pair of wires AC1 and AC2 for recording in a distant, parallel entry printer.

The apparatus according to this invention includes a Transmitter having the following basic operating characteristics:

The Transmitter receives and memorizes the following intelligence:

(1) The character of the abnormality or restoration—typically whether it is critical, such as a fire, or non-critical, such as a supervisory defect.

(2) Printing Instructions—typically to print reports of abnormalities in red and reports of restoration in black.

(3) The "tens" place of the number of the area where the abnormality or restoration occurred.

(4) The "units" place of the number of the area where the abnormality or restoration occurred.

(5) The "tens" place of the detector DE or DES detecting the abnormality or restoration.

(6) The "units" place of the detector DE or DES detecting the abnormality or restoration.

The Transmitter converts the above data into an automatic, six-digit code for transmission to the remote Receiver in accordance with the following numbering scheme:

| Code Digit No. | Pulse No. | Interpretation |
| --- | --- | --- |
| 1 | 1 | Critical. |
|   | 2 | Non-critical. |
| 2 | 2 | Print Red, Alarm. |
|   | 1 | Print Black restoration. |
| 3 | 1 | Area "tens" No. 1. |
|   | 2 | Area "tens" No. 2. |
|   | 3 | Area "tens" No. 3. |
|   | 4 | Area "tens" No. 4. |
|   | 5 | Area "tens" No. 5. |
|   | 6 | Area "tens" No. 6. |
|   | 7 | Area "tens" No. 7. |
|   | 8 | Area "tens" No. 8. |
|   | 9 | Area "tens" No. 9. |
| 4 | 1 | Area "unit" No. 1. |
|   | 2 | Area "unit" No. 2. |
|   | 3 | Area "unit" No. 3. |
|   | 4 | Area "unit" No. 4. |
|   | 5 | Area "unit" No. 5. |
|   | 6 | Area "unit" No. 6. |
|   | 7 | Area "unit" No. 7. |
|   | 8 | Area "unit" No. 8. |
|   | 9 | Area "unit" No. 9. |
|   | 10 | Area "unit" No. 10. |
| 5 | 1 | Detector "tens" No. 1. |
|   | 2 | Detector "tens" No. 2. |
|   | 3 | Detector "tens" No. 3. |
|   | 4 | Detector "tens" No. 4. |
|   | 5 | Detector "tens" No. 5. |
| 6 | 1 | Detector "unit" No. 1. |
|   | 2 | Detector "unit" No. 2. |
|   | 3 | Detector "unit" No. 3. |
|   | 4 | Detector "unit" No. 4. |
|   | 5 | Detector "unit" No. 5. |
|   | 6 | Detector "unit" No. 6. |
|   | 7 | Detector "unit" No. 7. |
|   | 8 | Detector "unit" No. 8. |
|   | 9 | Detector "unit" No. 9. |
|   | 10 | Detector "unit" No. 10. |

The Transmitter maintains decimal digit identity to permit distant receiver to record on a decimal basis.

The Transmitter controls its input time sequencing to:

(1) Insure only one set of inputs at any one time.

(2) Insure storage of subsequent inputs to void loss of signals.

The Transmitter transmits pulses to a remote Receiver through an ungrounded loop (AC1-AC2). But automatically transfers to an emergency operating communication channel using ground as a conductor under conditions of line fault.

The Transmitter reports line fault conditions as such to the Console. The Transmitter effectively transmits the code to remote Receiver under line-fault conditions of a one wire open, short, or ground. The Transmitter automatically resets to "home" prepared for re-transmission in the event of incompletion of transmission.

The Receiver serves to convert the six-digit decimal code from the Transmitter into six-bit, 100-millisecond, parallel input into a time-data Printer for printed registry of information as outlined in Table 1 above. The data received and recorded by this Receiver is delivered sequentially to the Receiver across a single pair of wires AC1-AC2.

The Receiver has the following basic operating characteristics.

(1) Receives and memorizes the date contained in the pulses of each digit of the code.

(2) Identifies interdigit transmission for proper sorting of pulses of the digits into separate digits.

(3) Receives and records pulses in the digits of the code on a decimal basis.

(4) Automatically restores to "home" or stand-by after successful registry of the data in the six digits.

(5) Automatically restores to "home" or stand-by, prepared to receive and record subsequent signals after recognition of incomplete pulsing.

(6) Normally receives pulses from the Transmitter through an ungrounded loop AC-AC2.

(7) Automatically transfers to an emergency operating mode through ground under conditions of a line fault.

(8) Successively receives and records Transmitter pulses under line fault conditions of a one wire open, short, or ground.

While a preferred embodiment of this invention has been disclosed herein many modifications thereof are feasible. This invention then is not to be restricted except insofar as is necessitated by the spirit of the prior art.

I claim as my invention:

1. Apparatus for conveying intelligence of abnormal conditions and/or restorations to normal conditions in any of a plurality of areas, comprising condition-detector means in each of said areas, intelligence processing means, first transmitting means responsive to said detector means for transmitting intelligence of abnormal conditions and/or restorations in any of said areas to said intelligence processing means, said processing means including means, connected to said first transmitting means, responsive to the completion of the processing of said intelligence by said processing means for actuating said first transmitting means to perform a predetermined operation appropriate to said completion, receiving means, remote-printer means for printing the data of said intelligence, second transmitting means connected to said processing means for transmitting the intelligence processed by said processing means to said receiving means, said second transmitting means including memory means connected to said processing means for preventing actuation of said completion-responsive actuable means until after the completion of the transmission of said intelligence by said second transmitting means, and means connected to said receiving means and to said remote-printer means for printing the intelligence processed by said processing means.

2. Apparatus for conveying intelligence of abnormal conditions in any of a plurality of areas, comprising condition-detector means in each of said areas, intelligence-processing means, first transmitting means responsive to said detector means for transmitting intelligence of abnormal conditions to said intelligence processing means, said processing means including means, connected to said transmitting means, operative on the occurrence of an abnormal condition in both a first and second area, for delaying the processing by said processing means, of the intelligence of an abnormal condition in one of said first and second areas until the intelligence as to the other of said first and second areas has been completely processed, receiving means, remote-printer means for printing the data of said intelligence, said printing means being capable of printing the data with respect to only of said first and second areas at a time, second transmitting means connected to said intelligence processing means for transmitting the intelligence received by said processing means to said receiving means, said second transmitting means including memory means connected to said processing means for extending the operation of said delaying means to delay the processing of said intelligence as to said one area until after the intelligence as to said other area has been completely transmitted by said second transmitting means, to said receiving means, and means connected to said receiving means and to said remote-printer means for printing said data.

3. Apparatus for conveying intelligence of abnormal conditions and/or restorations to normal conditions in any of a plurality of areas, comprising condition-detector means in each of said areas, first transmitting means responsive to said detector means for transmitting intelligence of abnormal conditions and/or restorations in any of said areas to an intelligence receiving center, receiving means, remote-printer means for printing the data of said intelligence, second transmitting means connected in intelligence transmitting relationship with said center for transmitting the intelligence received at said center to said receiving means, said second transmitting means including a plurality of storing systems each corresponding to a digit of said intelligence to be transmitted, said systems being connected to said first transmitting means to be actuated thereby to receive and store said digits, said second transmitting means also including a step switch connected to said systems to be actuated successively by said systems to produce successive electrical pulses in accordance with the digits of intelligence stored in said systems, and said second transmitting means transmitting, to said receiving means in the form of said pulses, the intelligence received at said center, and means connected to said receiving means and to said remote-printer means and responsive to said pulses received by said receiving means for printing said intelligence.

4. The apparatus of claim 3 wherein the receiving means includes a plurality of step switches each corresponding to a different digit of the intelligence to be transmitted and also includes means selectively connecting each said last-named step switches to the step switch of said second transmitting means, each step switch of said plurality to be stepped by the pulses, corresponding to its digit, from the step switch of said transmitting means, said step switches of said plurality remaining set at the positions corresponding to said digits to store the said intelligence, and wherein the receiving means also includes means connected to the remote-printer actuable on the completion of the transmission of the pulses of said digits by said step switch of said second transmitting means for printing said intelligence.

References Cited by the Examiner
UNITED STATES PATENTS

| | | | |
|---|---|---|---|
| 2,905,520 | 9/1959 | Anderson | 346—34 |
| 2,946,044 | 7/1960 | Bolgiano et al. | |
| 3,099,512 | 7/1963 | Kohler | 346—34 |
| 3,118,722 | 1/1964 | Pullis et al. | 346—34 |
| 3,138,791 | 6/1964 | Beguin | 340—223 |
| 3,189,882 | 6/1965 | Ward | 340—213 |
| 3,222,646 | 12/1965 | Hammer | 340—345 X |

NEIL C. READ, *Primary Examiner.*

D. YUSKO, *Assistant Examiner.*